US012630473B2

(12) United States Patent
Da et al.

(10) Patent No.: US 12,630,473 B2
(45) Date of Patent: May 19, 2026

(54) THIN GLASS SUBSTRATE WITH HIGH BENDING STRENGTH AND METHOD FOR PRODUCING SAME

(71) Applicant: Schott Glass Technologies (Suzhou) Co. Ltd., Jiang Su (CN)

(72) Inventors: Ning Da, Jiangsu (CN); Yanquan Shan, Jiangsu (CN); Feng He, Jiangsu (CN); Wei Xiao, Shanghai (CN); Weizhi Deng, Jiangsu (CN)

(73) Assignee: SCHOTT GLASS TECHNOLOGIES (SUZHOU) CO. LTD., Jiang Su (CN)

( * ) Notice: Subject to any disclaimer, the term of this patent is extended or adjusted under 35 U.S.C. 154(b) by 345 days.

(21) Appl. No.: 17/525,670

(22) Filed: Nov. 12, 2021

(65) Prior Publication Data

US 2022/0064061 A1 Mar. 3, 2022

Related U.S. Application Data

(63) Continuation of application No. PCT/CN2019/086830, filed on May 14, 2019.

(51) Int. Cl.
| | |
|---|---|
| *C03C 15/00* | (2006.01) |
| *C03B 33/02* | (2006.01) |
| *C03C 3/091* | (2006.01) |
| *C03C 17/32* | (2006.01) |
| *C03C 21/00* | (2006.01) |

(52) U.S. Cl.
CPC ........ *C03C 21/002* (2013.01); *C03B 33/0222* (2013.01); *C03C 3/091* (2013.01); *C03C 15/00* (2013.01); *C03C 17/32* (2013.01)

(58) Field of Classification Search
None
See application file for complete search history.

(56) References Cited

U.S. PATENT DOCUMENTS

| | | | |
|---|---|---|---|
| 2012/0135177 A1* | 5/2012 | Cornejo | .................... B24C 1/10 |
| | | | 225/2 |
| 2012/0135195 A1* | 5/2012 | Glaesemann | ...... B23K 26/0624 |
| | | | 428/156 |

(Continued)

FOREIGN PATENT DOCUMENTS

| | | |
|---|---|---|
| CN | 105246850 | 1/2016 |
| CN | 106029286 | 10/2016 |

(Continued)

*Primary Examiner* — Shamim Ahmed
(74) *Attorney, Agent, or Firm* — Ruggiero McAllister & McMahon LLC

(57) ABSTRACT

A method for producing a structured glass disk is provided that includes the steps of: providing a glass disk having a thickness of at most 400 μm; directing and focusing a laser beam onto the glass disk such that the laser beam produces an elongated focus within the glass disk with an intensity sufficient to produce damage within the glass disk along the elongated focus; moving the laser beam and the glass disk relative to one another to insert damage zones along a ring-shaped path so that a workpiece is defined in the glass disk with the ring-shaped path encompassing the workpiece and with the workpiece remaining connected to the glass disc; exposing the glass disk to an etchant so that the etchant intrudes into the damage zones; and chemically toughening the glass disk with the workpiece.

20 Claims, 10 Drawing Sheets

(56)     References Cited

U.S. PATENT DOCUMENTS

| | | | | |
|---|---|---|---|---|
| 2013/0292442 A1* | 11/2013 | Bayne | .................... | B26D 3/085 |
| | | | | 225/2 |
| 2014/0147624 A1 | 5/2014 | Streltsov | | |
| 2014/0170380 A1* | 6/2014 | Murata | ................... | C03C 3/087 |
| | | | | 428/141 |
| 2015/0166393 A1* | 6/2015 | Marjanovic | ........ | B23K 26/0622 |
| | | | | 65/61 |
| 2015/0166395 A1* | 6/2015 | Marjanovic | .......... | B23K 26/384 |
| | | | | 428/131 |
| 2015/0183680 A1 | 7/2015 | Barefoot | | |
| 2016/0152516 A1* | 6/2016 | Bazemore | ........... | B23K 26/082 |
| | | | | 65/30.14 |
| 2016/0199944 A1 | 7/2016 | Hosseini | | |
| 2016/0280582 A1 | 9/2016 | Lee | | |
| 2017/0183255 A1* | 6/2017 | Walther | ................... | C03C 3/083 |
| 2017/0183259 A1 | 6/2017 | Da | | |
| 2018/0029924 A1* | 2/2018 | Inoue | ................... | C03B 33/0222 |
| 2018/0166353 A1 | 6/2018 | Garner | | |
| 2018/0342450 A1* | 11/2018 | Huang | ............. | H01L 23/49838 |
| 2018/0362387 A1 | 12/2018 | Wieland | | |
| 2019/0033923 A1* | 1/2019 | Wang | .................... | G06F 3/0236 |
| 2019/0062200 A1* | 2/2019 | He | ......................... | C03C 3/078 |

FOREIGN PATENT DOCUMENTS

| | | |
|---|---|---|
| CN | 106029588 | 10/2016 |
| CN | 106132627 | 11/2016 |
| CN | 107074630 | 8/2017 |
| CN | 107926111 | 4/2018 |

* cited by examiner 70, 71    1    9    55    3    2

THIN GLASS SUBSTRATE WITH HIGH BENDING STRENGTH AND METHOD FOR PRODUCING SAME

CROSS REFERENCE TO RELATED APPLICATIONS

This application is a continuation of International Application PCT/CN2019/086830 filed May 14, 2019, the entire contents of which are incorporated herein by reference.

BACKGROUND

1. Field of the Invention

The invention relates to the processing of very thin glass panels. More specifically, the invention relates to a wafer/panel level processing of thin glass articles with high strength after surface and edge modification. The invention is also related to products including the glass articles as substrate or cover in color filter, filter printed electronics, sensor for touch control panels, finger print sensors, thin film battery substrates, mobile electronic devices, semiconductor interposers, bendable/foldable displays, solar cells, display, or other applications, in particular, where a combination of high chemical stability, temperature stability, low gas permeability, flexibility, high strength and low thickness is desired or advantageous. Besides consumer and industrial electronics, the glass articles may also be used for protection applications in industrial production or metrology.

2. Description of Related Art

Thin glasses with different compositions are suitable material for many applications where transparency, high chemical and thermal resistance, and defined chemical and physical properties are important. For example, alkaline free glasses can be used for display panels and as electronic packaging materials in wafer/panel format. Alkaline containing silicate glasses are used for filter coating substrate, touch sensor substrate, fingerprint sensor module, display cover and bendable or foldable display covers.

As well, aluminosilicate (AS), lithium aluminosilicate (LAS), borosilicate and soda-lime glasses are widely used for applications such as substrate for filters, covers for finger print sensor (FPS), protection cover, display cover, and bendable/foldable display covers. For these applications, the glasses may be chemically toughened to achieve a high mechanical strength, as determined by special tests, e.g., 2-point bending (2PB), 3-point bending (3PB), ball drop, ring on ring (RoR), anti-scratch, pen drop, static and dynamic bending, and others.

Edge grinding and chemical toughening are well known conventional procedures to increase strength of glass like soda lime glass or aluminosilicate (AS) glass or lithium aluminosilicate (LAS) or borosilicate glasses used, e.g., as cover glass for display applications. In this regard, the surface compressive stresses (CS) are typically between 200 and 1,300 MPa and the depth of the ion-exchange layer is typically larger than 30 μm, preferably bigger than 40 μm. For safety protection applications in transportation or aviation, AS glass may have exchange layers bigger than 100 μm.

Normally, a glass having both high CS and high DoL is targeted for all these applications. However, glass is difficult to be cut to size after toughening without sacrificing the mechanical strength. Thus, the toughening process is generally applied to panes having the size and thickness of the final glass product. For example, the size and thickness are generally larger than 4" and 0.4 mm for the cover glass of smartphone size, the size and thickness are generally larger than 10*10 mm and 0.145 mm for the cover glass of finger printing sensor (FPS). In other applications, such as color filter or 3D imaging sensors, the glass is cut into size around 77*77 mm or other wafer size (4", 6", 8", or 12"), following up with a coating process. To reduce the cost of the single piece processing method, a large-scale production method by toughening large size glass, like G2, G5 size and then cutting were developed, which is well known for the so called "one glass solution" (OGS). The advantage of this method is an economic benefit. However, the ion exchanging depth (also called "diffusion of length", DoL) is limited to low values to avoid the breakage during cutting. However, a low DoL results in a low scratching resistance and lower bending strength. Additionally, due to the cutting process, the edges experience some untoughening. Together with defects such as cracks and chippings at the glass cutting edges, this results in a significant reduction of the overall mechanical strength i.e., reflected in bending or impact strength.

Therefore, for the time being, chemical toughening is limited only to certain applications, and not suitable as cover for display, foldable/bendable displays, and smartphones. In other application fields, such as color filter or 3D imaging sensor, the glass with the thickness larger than 0.2 mm is cut into size around 77*77 mm or other wafer sizes (4", 6", 8", or 12"), following up with coating processes. Then the sheet will be diced into small size like 6*6 mm. However, the glass will have lower strength since toughening is not suitable either on large sheets before coating or on small pieces after coating. Specifically, the production costs rise for smaller sized panes if these panes are first cut to size and are then toughened.

Chemical toughening of thin glass has been described in various publications. US 2015/183680 A1 describes a toughened glass with a thickness of below 0.4 mm with limited range of central tension range and a DoL>30 μm by edge grinding and toughening. US2016280582 A1 describes a toughened glass cutting article. The drawbacks are DoL limitation and lower strength. In addition, the method involves cutting the toughened glasses by preheating the part to be cut. This might improve the cutting yield, but still not solve the issue of lower strength of the glass after cutting.

Further, glasses are used as substrates for optical coatings such as infrared cut filters. For coating purposes it is particularly beneficial to apply the coating on large-scale panes and later cut the coated panes to the desired size. However, the handling of large-scale panes is difficult if thin glasses are employed as substrates due to their low strength.

US 2018/0362387 A1 discloses a method of forming a glass article where a first array of first damage regions and a second array of second damage regions are formed in a glass substrate sheet. The glass substrate sheet is then exposed to an etching medium which opens the connection across the first array of first damage regions so that a plurality of first portions is separated from the surrounding glass. This way, an array of openings is produced. Similarly, the second array of second damage regions forms separation lines upon etching, which form a plurality of second portions, each containing one of the openings. The second array of damage regions contains interrupted zones so that the separation is interrupted, keeping the second portions connected. The second portions may be separated from the glass sheet so as to obtain a plurality of glass articles.

SUMMARY

It is an object of the invention to improve the toughness and handling of very thin glass sheets.

Generally, the invention provides a wafer/panel scale glass article with a thickness≤0.4 mm that can be toughened and segregated into smaller glass with high strength after toughening.

A high strength glass article with flexible production method in an economic way would be very desirable for the industry. In addition, the continuous demand for new functionality of products and further applications demand for glass substrates even thinner and lighter with high strength and flexibility. The fields in which thin glass is typically applied are substrate for filters, touch panels, protective cover of fine electronics, flexible cover for bendable/foldable display or smartphone. This invention addresses these issues and provide one solution to achieve thin glass (≤0.4 mm) with high strength in an economical way.

Typically, flat ultrathin glasses with thickness of at most 0.4 mm can be produced by direct hot-forming methods such as down draw, overflow fusion or special float procedures. Redraw and thinning, e.g., chemical thinning via etching with acids or abrasive methods are also possible.

Generally, the invention provides a glass article and method to produce glass panes with the advantages of thinner, lighter, and high strength. These articles may, e.g., serve as substrates for optical filters.

The production includes producing a pre-scored structured wafer or pane, etching, and toughening, optionally post-etching. Optionally, the process may involve additional coating (including one side anti-reflection coating, and the other side color filter coating), and then segregating into small pieces. The coating methods can be CVD, PVD, magnetic sputtering, spraying, sol-gel, spinning, printing, bar coating, roller coating. Optional curing via UV light, high temperature heating can be added.

Specifically, a method for producing a structured glass disk is contemplated, comprising the steps of: providing a glass disk having a thickness of at most 400 μm, directing and focusing the laser beam of a ultrashort pulsed laser onto the glass disk, the laser beam having a wavelength at which the glass of the glass disk is transparent so that the laser beam can penetrate into the glass disk, the laser beam being focused to produce an elongated focus within the glass disk, the intensity of the laser beam being sufficient to produce a damage zone within the glass disk along the focus, the laser beam being moved relative to the glass disk to insert a plurality of damage zones side by side along at least one ring-shaped path on the glass disk so that at least one workpiece or die is defined in the glass disk, with the ring-shaped path encompassing the workpiece. However, the workpiece remains connected to the surrounding sections of the glass disk so that the workpiece can be further processed. Preferably, after inserting the plurality of damage zones, an etching step by exposing the glass disk to an etchant is performed. The etchant intrudes into the damage zones. This way, the damage zones can be repaired to a certain extent to reinforce the strength of the workpiece and its connection to the surrounding parts of the disk so as to withstand following processes.

The damage zone is typically elongated, in particular filament shaped or line shaped. This is since the damage zone extends along the elongated focus. Owing to the direction of the laser beam the longitudinal direction of the elongated damage zone extends along a direction from one side face towards the opposite side face of the glass disc.

After the damage zone insertion and the preferred etching, a chemical toughening of the glass disk with the at least one workpiece is performed.

In the following, the invention is described in more detail with respect to specific embodiments and with reference to the drawings.

DETAILED DESCRIPTION

Figure 1:
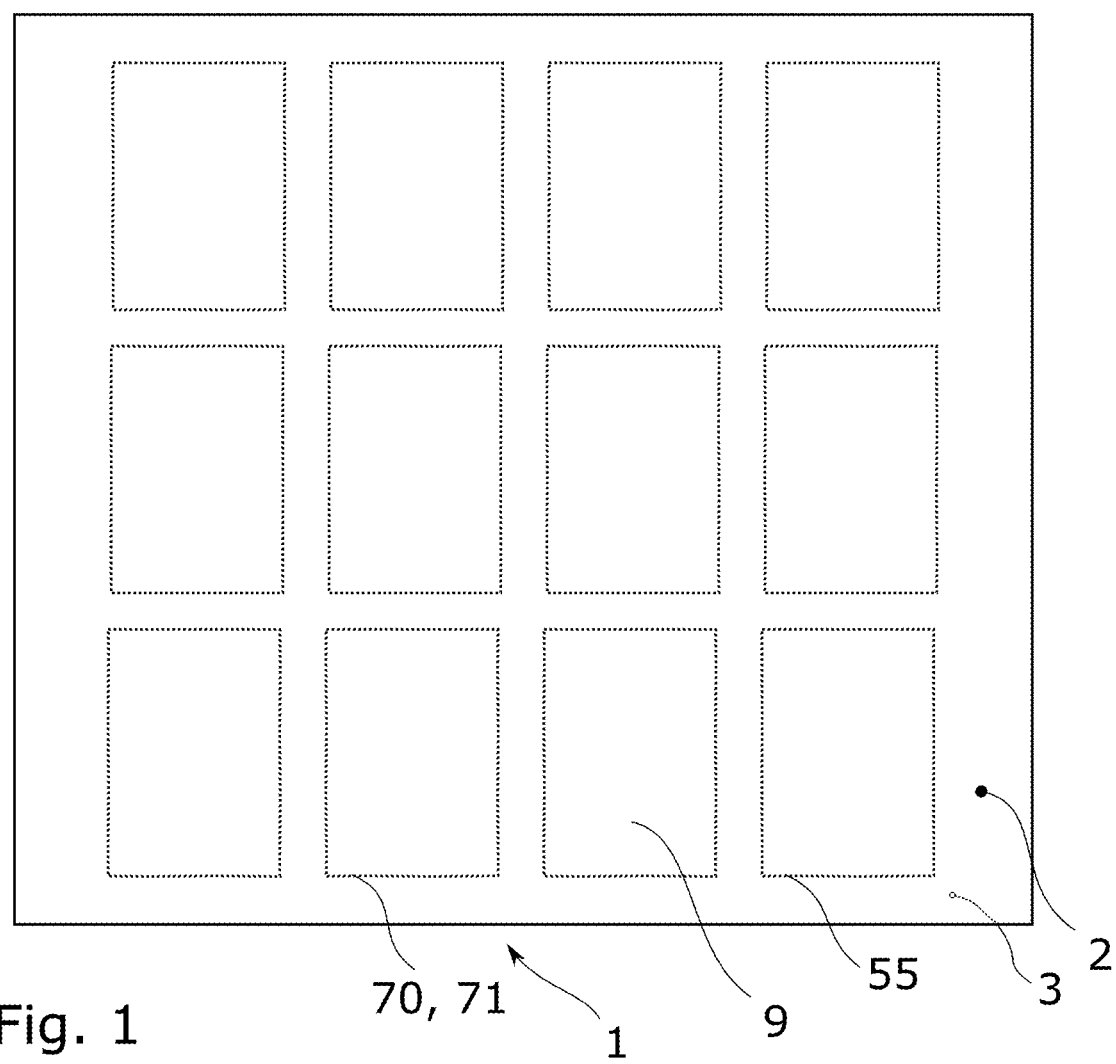
FIG. 1 shows a structured glass disk.

With the process as described above, a chemical toughening of a multitude of thin glass workpieces can be performed batch-wise on a wafer level, thereby considerably facilitating handling of the small workpieces.

With the method as described above, a structured glass disk is obtained, the glass disk having two opposed side faces and a thickness of at most 400 μm. A plurality of channels extends through the glass disk in direction from one side face towards the opposite side face. According to a refinement, at least some of these channels may be openings that connect the side faces of the glass disk. The channels are arranged side by side and are stringed along a ring-shaped path. The section of the glass disk surrounded by the ring-shaped path of the side by side arranged openings forms a workpiece that is segregatable from the glass disk along the ring-shaped path. Further, the glass disk is chemically toughened so that both side faces thereof have an ion-exchanged layer that exerts a compressive stress along the side faces.

The channels are in general already formed by the laser scoring. In other words, the damage zones already constitute channel within the glass disc. Etching is to modify the defects caused by the laser and make the structured glass strong enough to endure the following chemically toughening process.

This disclosure further concerns the glass article obtained by segregating a workpiece from a structured glass disk as described above.

With the separation of the workpiece, a glass article is obtained, that may be used or further processed for a variety of application such as display covers.

Thus, according to a development of the invention, a method for producing a glass article comprising a glass pane with a thickness of at most 400 µm is provided, comprising the steps of producing the structured glass disk as described herein and then separating the chemically toughened workpiece from the glass disk to obtain a glass article.

As described above, the method may advantageously include a further coating step. The coating can be selected for example from the group consisting of a silicone polymer, a sol-gel polymer, polycarbonate (PC), polyethersulphone, polyacrylate, polyimide (PI), an inorganic silica/polymer hybrid, a cycloolefin copolymer, a polyolefin, a silicone resin, polyethylene (PE), polypropylene, polypropylenepolyvinyl chloride, polystyrene, styrene-acrylonitrile copolymer, thermoplastic polyurethane resin (TPU), polymethyl methacrylate (PMMA), ethylene-vinyl acetate copolymer, polyethylene terephthalate (PET), polybutylene terephthalate, polyamide (PA), polyacetal, polyphenyleneoxide, polyphenylenesulfide, fluorinated polymer, a chlorinated polymer, ethylene-tetrafluoroethylene (ETFE), polytetrafluoroethylene (PTFE), polyvinyl chloride (PVC), polyvinylidene chloride (PVDC), polyvinylidene fluoride (PVDF), polyethylene naphthalate (PEN), a terpolymer made of tetrafluroethylene, a terpolymer made of hexafluoropropylene, and a terpolymer made of vinylidene fluoride (THV) or polyurethane, or mixtures thereof. The coating may be deposited preferably by CVD, PVD or liquid coating, e.g., by a sol-gel-process, bar coating, spinning, printing, roller coating etc. In particular it is advantageous to apply the coating after the chemical toughening so that the coated glass article has a high mechanical stability. Thus, according to a refinement, the method further includes applying a coating onto at least one of the side faces of the glass disc, the coating preferably being applied after the chemical toughening. With the method described herein, edge effects of the coating can be effectively reduced. Edge effects are generally referred to as deviating properties of a coating near the edge of the substrate. One prominent edge effect is a thickness variance at the edges. Generally, a conventional way of coating on a processed glass sheet, the coating on the edge of the glass sheet is not homogenous as in the inner part, and in certain cases, the edge part will even be considered as invalid region. Therefore, the glass sheet cannot be used as a cover for display applications. The method with coating on wafer level, or with the workpiece being held processed together with the surrounding parts of the glass disk provides an effectively way to solve this issue. Alternatively or additionally, the coated layer can comprise or consist of a duroplastic reaction resin that is a polymer selected from the group consisting of phenoplasts, phenol formaldehyde resins, aminoplasts, urea formaldehyde resins, melamine formaldehyde resins, epoxide resins, unsaturated polyester resins, vinyl ester resins, phenacrylate resins, diallyl phthalate resins, silicone resins, crosslinking polyurethane resins, polymethacrylate reaction resins, and polyacrylate reaction resins, acrylic resin, acrylic-siloxane hybrid, epoxy siloxane hybrid etc. Such a coated layer can be a hard coating with high hardness (preferably with a pencil hardness >2H).

The hard coating can be directly deposited on a surface of the glass article or can be deposited on a polymer layer that has previously been coated/laminated on the glass article. An additional hard coating, can improve the scratching resistance of polymer layer besides improve the impact resistance.

Surprisingly, the invention provides a usefully way of producing flexible covers for bendable/foldable displays, smartphones, wearable electronics, TVs, notebooks, computer tablets, electronic paper, and so on. As an example, a large glass sheet with a thickness ≤0.175 mm and size ≤2000*2000 mm can be processed by first pre-scoring with the ultrashort pulsed laser, etching, toughening, optionally coating with polymer layers, organic layers with a thickness preferably from 0.1 µm to 0.5 mm, and then segregating to obtain a plurality of chemically toughened thin glass articles, or workpieces, respectively. Preferably, a polymer coating has a thickness of ≤0.2 mm, more preferably ≤0.15 mm, more preferred ≤0.1 mm or ≤0.08 mm, particularly ≤0.07 mm. However, it is advantageous for the function of the polymer layer if the thickness is at least 0.005 mm.

Generally, without restriction to this example, a glass/polymer laminate may be produced by laminating at least one polymer layer to the workpiece. In particular, two or more workpieces may be laminated together with intermediate polymer layers. This way, a glass and polymer laminate can be produced having characteristics of flexibility, bendability, and high impact resistance. These laminates are, inter alia, suitable as covers for foldable or bendable displays.

In the following, some technical terms used in this disclosure are explained:

Glass disk: The glass disk can be of any size. For example it could be a long ultrathin glass ribbon that is rolled (glass roll), a large glass sheet, a glass wafer, a smaller glass part cut out of a glass roll or out of a glass sheet or a single small glass article (like an FPS or display cover glass, or a color filter substrate) etc.

Thickness (t): The thickness of a glass disk is the arithmetic average of the thickness of the sample to be measured.

Compressive Stress (CS): The induced compression among glass network after ion-exchange on the surface layer of glass. The compression is not released by deformation of glass and sustained stress. CS decreases from a maximum value at the surface of the glass article (surface CS) towards the inside of the glass article. Commercially available test machines such as FSM6000 measure the CS by a waveguide mechanism.

Depth of Layer (DoL): The thickness of the ion-exchanged layer with CS on the surface of glass. Commercially available test machine such as FSM6000 measure the DoL by a wave guide mechanism.

Central Tension (CT): When a compressive stress CS is induced on one side or both sides of single glass sheet, to balance the stress according to the 3rd principle of Newton's law, a tension stress is induced in the center region of glass. This stress is called central tension. CT can be calculated from measured CS and DoL values.

Average roughness (Ra): A measure of the texture of a surface. It is quantified by the vertical deviations of a real surface from its ideal form. Commonly amplitude parameters characterize the surface based on the vertical deviations of the roughness profile from the mean line. Ra is arithmetic average of the absolute values of these vertical deviations.

The invention provides a structured and chemically toughened glass panel or glass disk 1 as shown in FIG. 1. The glass disk has a thickness (t) of less than 0.4 mm, a first surface or side face 2 and a second surface or side face 3, opposed to side face 2. The structured glass disk 1 is chemically toughened and has a compressive stress region extending from the first surface to a first depth in the glass article (DoL), the region is defined by a compressive stress (CS). Preferably, without restriction to the shown embodiment, the glass disk has a surface CS at its side faces of at least 100 MPa. In the glass disk 1 a plurality of workpieces 9 is defined by regions surrounded by channels 70 arranged side by side so as to form ring-shaped paths 55. The channels 70 may extend through the glass disk 1, connecting the side faces 2, 3 so as to form openings 71.

Figure 2:
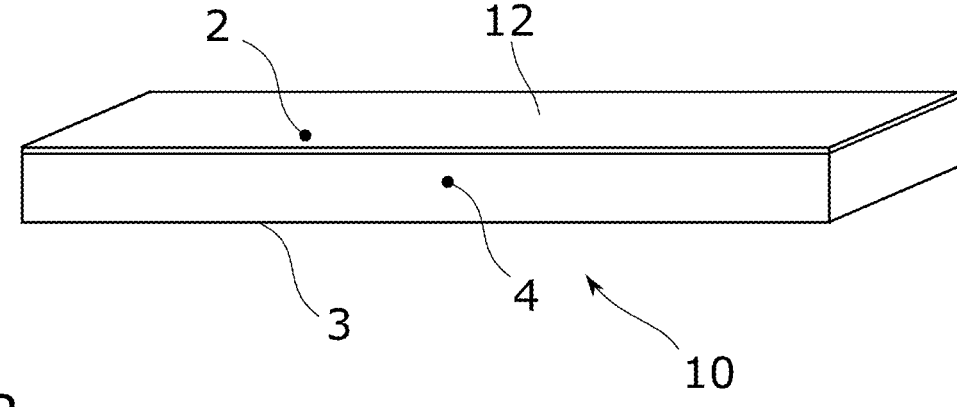
FIG. 2 shows a glass article segregated from the glass disk depicted in FIG. 1.

The workpieces 9 may be easily separated from the glass disk 1 so as to form segregated glass articles 10 as shown in FIG. 2.

The segregated glass article 10 has a first surface or side face 2 and an opposed second surface or side face 3. As the article 10 is separated from the glass disk 1, it has the same or similar properties. In particular, the glass article 10 has a compressive stress region extending from the side faces 2, 3 to a first depth in the glass article (DoL), the region being defined by a compressive stress (CS) wherein a surface CS at the side faces 2, 3 is at least 100 MPa.

Optionally, the glass article 10 may have a coating 12 on one or both of its side faces 2, 3. In the example shown, a coating is only applied to side face 2. For example, the coating 12 may be an infrared cut filter. Additionally or alternatively, the coating may include a hard coating, e.g., to improve scratch resistance. A hard coating according to an embodiment has a thickness of ≤0.2 mm, or ≤0.15 mm, preferably ≤0.1 mm, ≤more preferred 0.08 mm, particularly preferred ≤0.07 mm, or even ≤0.05 mm. However, it is preferred that the hard coating has a thickness of at least 0.001 mm to ensure mechanical stability.

Figure 3:
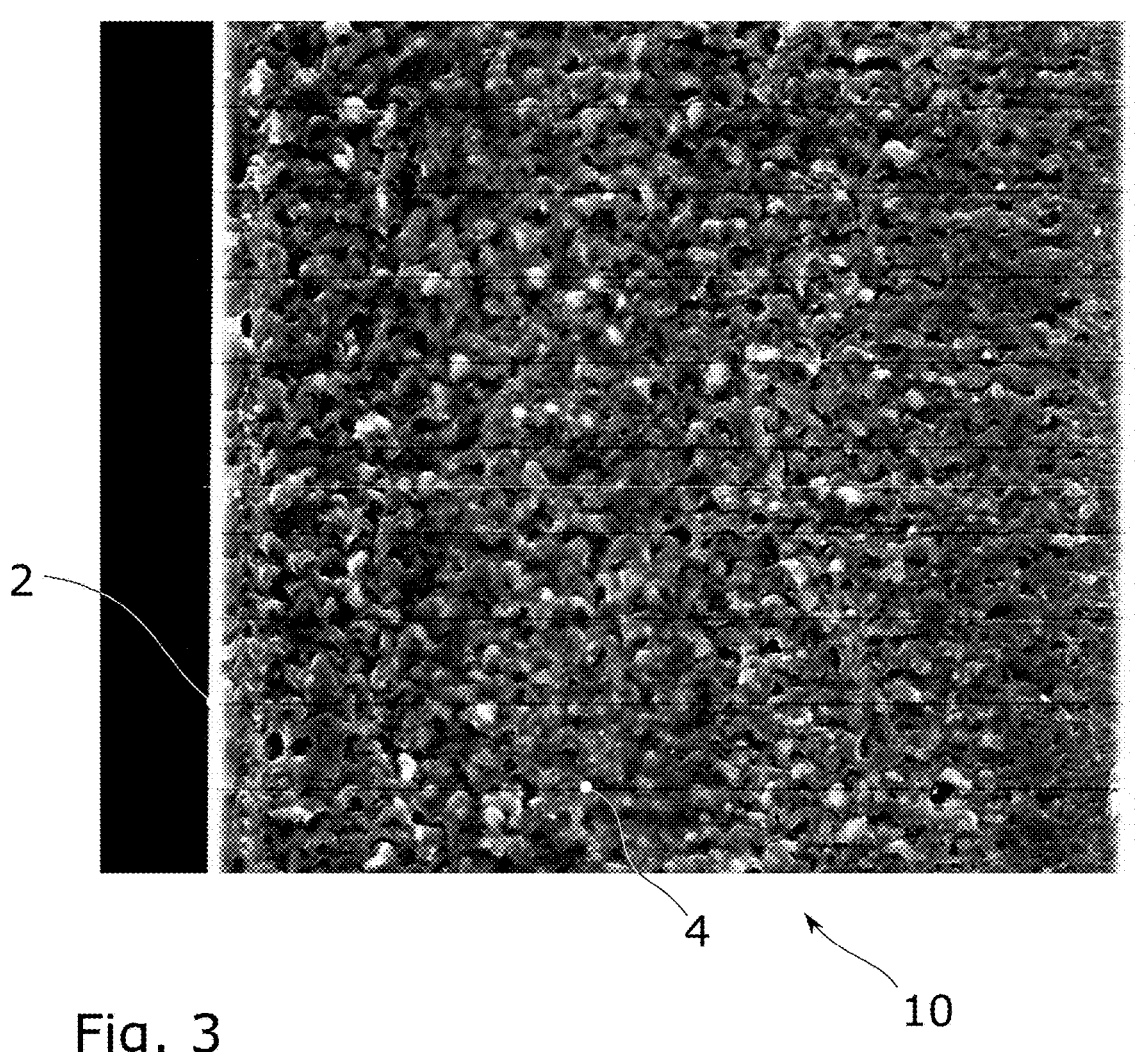
FIG. 3 shows a SEM micrograph of the edge of a glass article.

Due to the etching, the edge surface 4 of the glass article 10 may have a surface roughness larger than 10 nm. A SEM micrograph of the edge of a glass article 10 is shown in FIG. 3. As can be seen, the edge surface 4 has a higher roughness than the side face 2. Generally, without restriction to the depicted embodiment, the surface roughness of the edge surface may exceed 10 nm. The roughness may also be at least 20 nm, preferably at least 30 nm, particularly at least 40 nm. However, the roughness should not exceed 0.1 mm.

A glass article 10 according to the invention typically has an optimized localized stress profile. Due to the batch processing of the workpieces 9 defined in the glass disk 1, a glass article 10 as described in this disclosure is well suited and very economical for mass production, particularly as small sized articles, such as coating substrates, covers, filter substrates with high strength. As described above, glass articles with a thickness of ≤0.4 mm, preferably with a thickness of ≥0.02 mm may be used in many fields of daily applications, e.g., as coating or filter substrate. To minimize the size of a filter device for consumer electronics, the substrate thickness is requested to be as thin as possible. Normally, there is a contradiction between strength and thickness. The lower the strength, the lower the thickness. Therefore, chemically toughening is a way to solve the issue, which can significantly increase the strength for thinner glasses. Further, the method provides a cost-efficient processing for small sized substrates.

Further, to provide tough glass articles 10, it is generally advantageous if the glass article 10 has at least one of the following features.

The glass article has a breakage height (given in mm) of at least 200 times of its thickness, measured using a pen drop test (details of the test are explained below).

The breakage bending radius of the glass article (given in mm) is smaller than 100000+t/CS, wherein t is the thickness of the glass article (given in the unit "mm") and CS is the figure of the surface compressive stress (given in the unit "MPa"). That means in the latter calculation, the product is divided by a figure which corresponds to the respective measured surface compressive strength (given in MPa) at the first surface of the glass article.

The glass article can be coated with polymer layer without edge effect and then segregating to small pieces.

By means of the above criteria it can be decided whether a strengthened ultrathin glass article is suitably strong and flexible enough to be used for the respective application before it becomes part of a product. It was found that the breakage height of a pen drop test is strongly related to glass thickness and surface status. Specifically, thinner glass is especially sensitive to breakage caused by impacts.

Surprisingly it was found by the inventors that the breakage height criterion for an ultrathin glass can be described by the inventive factor 200 and the thickness of the glass article. The inventive factor will be valid if the breakage height of the glass article is determined in the pen drop test. In this dynamic test, the glass article is placed with its second surface on a 100 μm thick substrate, which consists of a 50 μm thick polyethylene layer and a 50 μm PSA layer (PSA="Pressure Sensitive Adhesive"). The first surface of the glass article is orientated upwards and impacted until breakage by a 4.5 g pen with a ball-point having a diameter of 300 μm and made from tungsten carbide. Step by step the drop height of the pen is increased until the glass article breaks. The test is performed on small samples (e.g., 20 mm×70 mm) at room temperature of about 20° C. and relative humidity of about 50%. The breakage height (also called "pen drop height") is the maximum height that can be applied when the glass article breaks into two or several pieces (cracks are generated). The breakage is determined by the observation of naked eyes.

This test is adjusted to and is especially suitable for ultrathin glass articles and reproduces in a quite simple manner the above-mentioned problem, that is the impact contact between the glass article (e.g., a touch display) and an external object when the glass article falls down or is hit.

It was also found by the inventors that the breakage bending radius criterion for an ultrathin glass can be described by the inventive factor 100000, the thickness and measured surface CS of the glass article as mentioned above. The inventive factor will be valid if the breakage bending radius of the glass article is determined in a two-point bending test as described now. The breakage bending radius is determined by using a UTM (universal testing machine) on small samples (e.g., 20 mm×70 mm) at room temperature of about 20° C. and relative humidity of about 50%. The glass article is brought into a bent position and its opposite ends are positioned between two parallel plates (steel plates). Then the distance between the plates is lowered so that the bending radius of the glass article decreases wherein the loading speed is 60 mm/min. The distance between the plates is recorded when the ultrathin glass article is kinking or damaging or breaking into two or several piece which is determined by the signal of the UTM software. From that distance the corresponding bending radius of the glass article at the time of breakage is calculated. This two-point bending test is adjusted to and is especially suitable for ultrathin glass articles. In this context of the invention it was found out that the two-point bending method is more meaningful than other known bending strength tests such as 3- and 4-point bending tests.

In a preferred embodiment, the glass disk 1, or the glass article 10, respectively, has a thickness of 150 μm at most. Glass articles with thickness ≤0.15 mm are used in many fields of daily applications, e.g., as cover for flexible/ foldable smartphones and tablets. To increase the strength of the cover glass, toughening, preferably chemically toughening, is performed. In this context, it is advantageous to produce a high compressive strength and a DoL, which is roughly 0.1 to 0.2 times the thickness of the glass article. However, it was also found by the inventors that the glass articles according to this disclosure are more reliable concerning flexibility and impact resistance if a further surface modifying process is performed. A chemically toughened glass article 10 according to this disclosure can have quite different sizes. Therefore, in the course of determining the breakage height and breakage bending radius the following has to be taken into account: In the case of larger glass articles (e.g., a glass roll or a large glass sheet), a plurality of samples is measured regarding breakage height using the pen drop test. For this, a random sample N values is taken. N should be high enough to obtain a statistically significant average value. Preferably at least 20, more preferably at least 30 samples are tested. The number of samples depends on the respective size of the glass article to be tested. The measured values are statistically evaluated using the Weibull method. The B10 value of Weibull distribution (that is the calculated height (in mm) wherein 10% of the samples are broken) is determined and taken to represent the breakage height.

However, in the case of small glass articles (e.g., an individual small cover glass) a single measured value of breakage height is sufficient and is taken to represent breakage height. In the case of a number of measured values between 2 and 19, the average of measured breaking height is used to represent the breakage height. For the breakage bending radius an average value can be calculated. For this a random sample of N values is taken. The number of samples depends on the respective size of the glass article to be evaluated. Preferably N should be high enough to obtain a statistically ensured average value. Preferably at least 20, more preferably at least 30 samples are tested. Thus, a random sample of N values is evaluated to determine the breakage bending radii R1 . . . RN, and, for the values of these random samples, the average value $$\langle R \rangle = \frac{1}{N} \sum_{i=1}^{N} R_i$$

and the variance $$s = \sqrt{\frac{1}{N-1} \sum_{i=1}^{N} (R_i - \langle R \rangle)^2}$$

are calculated.

The average breakage bending radius is taken to represent breakage bending radius. However, in the case of small glass articles (e.g., an individual small cover glass) a single measured value of breakage bending radius is sufficient and is taken to represent breakage bending radius. The average value and variance of the breakage height are calculated accordingly.

In one embodiment, the glass of the glass disk 1 and the glass article 1 is an alkali-containing glass, such as alkali aluminosilicate glass, alkali silicate glass, alkali borosilicate glass, alkali aluminoborosilicate glass, alkali boron glass, alkali germinate glass, alkali borogermanate glass, alkali soda lime glass, and combinations thereof.

The ultrathin glass article according to the invention has a thickness less than or equal to 400 μm, preferably less than or equal to 330 μm, less than or equal to 250 μm, less than or equal to 210 μm, less than or equal to 180 μm, even less than or equal to 150 μm, more preferably less than or equal to 130 μm, more preferably less than or equal to 100 μm, more preferably less than or equal to 80 μm, further preferably less than or equal to 50 μm. According to one embodiment, the glass disk may have a thickness of less than or equal to 30 μm, preferably less than or equal to 10 μm. Generally, the thickness is preferably at least 5 μm. Such particularly thin glass articles are desired for various applications as described above. In particular, the low thickness provides a high flexibility.

To gain good chemical toughening properties, the glass should contain a fair amount of alkaline metal ions, preferably $Na_2O$. Furthermore, a certain content of $K_2O$ in the glass composition can also improve chemical toughening rate. Furthermore, it is found that $Al_2O_3$ in the glass composition can significantly improve the toughening performance of glass. Thus, according to one embodiment of the glass disk 1 and the glass article 10, the glass contains $Al_2O_3$ and both $Na_2O$ and $K_2O$, with the $K_2O$ content being less than the $Na_2O$ content.

In a preferred embodiment, $SiO_2$ is the major glass network former in the glass used for the glass disk 1 or the glass article 10.

Additionally, also $Al_2O_3$, $B_2O_3$ and $P_2O_5$ may be used as glass network formers. According to a further embodiment, the content of the sum of $SiO_2$, $B_2O_3$ and $P_2O_5$ is at least 40 wt.-% (wt.-%="weight percent") of the glass composition to facilitate hot forming and drawing the glass to a low thickness of 400 μm at most. Otherwise, the glass sheet may be difficult to form and could become brittle and loose transparency. A high $SiO_2$ content may require high melting and working temperature of glass production. Thus, according to a further alternative or additional embodiment, the $SiO_2$-content is less than 90 wt.-%. In preferred embodiments, the content of $SiO_2$ in the glass is between 40 and 75 wt.-%, more preferred between 50 and 70 wt.-%, even more preferably between 55 and 68 wt.-%. In other preferred embodiments, the content of $SiO_2$ in the glass is between 55 and 69 wt.-%, more preferred between 57 and 66 wt.-%, even more preferably between 57 and 63 wt.-%. In a further preferred embodiment, the content of $SiO_2$ in the glass is between 60 and 85 wt.-%, more preferred between 63 and 84 wt.-%, even more preferably between 63 and 83 wt.-%. In another further preferred embodiment, the content of $SiO_2$ in the glass is between 40 and 81 wt.-%, more preferred between 50 and 81 wt.-%, even more preferably between 55 and 76 wt.-%.

Adding $B_2O_3$ and $P_2O_5$ to $SiO_2$ can modify the network property and reduce the melting and working temperature of glass. Also, the glass network former has big influence on the CTE (CTE="Coefficient of Thermal Expansion") of the glass.

According to yet a further embodiment, the glass composition contains $B_2O_3$, $B_2O_3$ in the glass network forms two different polyhedron structures which are more adaptable to loading force from outside. Addition of $B_2O_3$ can usually result in lower thermal expansion and lower Young's modulus which in turn leads to good thermal shock resistance and slower chemical toughening speed through which low CS and low DoL could be easily obtained. Therefore, the addition of $B_2O_3$ to the glass composition for ultrathin glass can greatly improve the chemical toughening processing window, improve the thermal and mechanical properties of the ultrathin glass and enables further practical applications for chemically toughened ultrathin glass. In preferred embodiments, the amount of $B_2O_3$ in the glass of the invention is between 0 and 20 wt.-%, more preferably between 0 and 18 wt.-%, more preferably between 0 and 15 wt.-%. In some embodiments the amount of $B_2O_3$ can be between 0 and 5 wt.-%, preferably between 0 and 2 wt.-%. In particular, the amount of $B_2O_3$ can be between 5 and 20 wt. %, preferably between 5 and 18 wt.-%. If the amount of $B_2O_3$ is too high, the melting point of the glass may be too high. Moreover, the chemical toughening performance is reduced when the amount of $B_2O_3$ is too high. $B_2O_3$ free variants are also possible and can be preferred.

$Al_2O_3$ works both as glass network former and glass network modifier. The $[AlO_4]$ tetrahedral and $[AlO_6]$ hexahedral form in the glass network depending on the amount of $Al_2O_3$, and influence the ion-exchanging speed by changing the size of space for ion-exchange inside glass network. Generally, the content of this component varies depending on the respective glass type. Therefore, glasses according to some embodiment preferably comprise $Al_2O_3$ in an amount of at least 2 wt.-%, more preferably in an amount of at least 10 wt.-% or even at least 15 wt.-%. However, if the content of $Al_2O_3$ is too high, the melting temperature and working temperature of glass will also be very high and the glass may tend to produce crystallites, thereby reducing transparency and flexibility. Therefore, some glasses of the invention preferably comprise $Al_2O_3$ in an amount of at most 30 wt.-%, more preferably at most 27 wt.-%, more preferably at most 25 wt.-%. Some advantageous embodiments can comprise $Al_2O_3$ in an amount of at most 20 wt.-%, preferably of at most 15 wt.-% or of at most 10 wt.-%, or even preferably at most 8 wt. %, preferably at most 7 wt. %, preferably at most 6 wt. %, preferably at most 5 wt. %. Some glass variants can be free of $Al_2O_3$. Other advantageous glass variants can comprise at least 15 wt. %, preferably at least 18 wt. % $Al_2O_3$ and/or at most 25 wt. %, preferably at most 23 wt. %, more preferably at most 22 wt. % $Al_2O_3$.

Alkaline oxides like $K_2O$, $Na_2O$ and $Li_2O$ work as glass network modifier. They can break the glass network and form non-bridging oxide within the glass network. Adding alkaline can reduce the working temperature of glass and increase the CTE of glass. In particular, sodium and lithium are important constituents for thin glass to enable chemical toughening. The ion exchanges of $Na^+/Li^+$, $Na^+/K^+$, $Li^+/K^+$ are important for the toughening. Generally, the glass may not be toughened if it does not contain some alkaline. However, sodium is preferred over lithium because lithium may significantly reduce the diffusivity of the glass. Therefore, some glasses of the invention preferably comprise $Li_2O$ in an amount of at most 5 wt. %, more preferably at most 4 wt. %, more preferably at most 2 wt. %, more preferably at most 1 wt. %, more preferably at most 0.1 wt. %. Some preferred embodiments are even free of $Li_2O$. Depending on the glass type a lower limit for $Li_2O$ can be 3 wt. %, preferably 3.5 wt. %.

The glasses of the invention preferably comprise $Na_2O$ in an amount of at least 4 wt. %, more preferably at least 5 wt.

%, more preferably at least 6 wt. %, more preferably at least 8 wt. %, more preferably at least 10 wt. %. Sodium is very important for the chemical toughening performance as the chemical toughening preferably comprises the ion exchange of sodium in the glass with potassium in the chemical toughening medium. However, the content of sodium should also not be too high because the glass network may be severely deteriorated and glass may be extremely hard to be formed. Another important factor is that ultrathin glass should have low CTE, to meet such requirement glass should not contain too much $Na_2O$. Therefore, the glasses preferably comprise $Na_2O$ in an amount of at most 30 wt. %, more preferred at most 28 wt. %, more preferred at most 27 wt. %, more preferred at most 25 wt. %, more preferred at most 20 wt. %.

The glasses of the invention may comprise $K_2O$. However, as the glasses are preferably chemically toughened by exchanging sodium ions in the glass with potassium ions in the chemical toughening medium, a too high amount of $K_2O$ in the glass will compromise the chemical toughening performance, in particular the CS value. Therefore, the glasses of the invention preferably comprise $K_2O$ in an amount of at most 10 wt. %, more preferred at most 8 wt. %. Some preferred embodiments comprise at most 7 wt. %, other preferred embodiments at most 4 wt. %, more preferred at most 2 wt. %, more preferred at most 1 wt. %, more preferred at most 0.1 wt. %. Some preferred embodiments are even free of $K_2O$.

However, the total amount of alkaline oxides should preferably not be higher than 35 wt.-%, preferably not higher than 30 wt.-%, more preferably not higher than 28 wt. %, more preferably not higher than 27 wt. %, even preferably not higher than 25 wt. %, for the glass network may be severely deteriorated and glass may be extremely hard to be formed. Some variants comprise an alkaline content of at most 16 wt.-%, preferably of at most 14 wt.-%.

Another important factor is that ultrathin glass should have low CTE, to meet such requirement glass should not contain too much alkali elements. However, as described above, the glasses should contain alkali elements in order to facilitate chemical toughening. Therefore, the glasses of the present invention preferably comprise alkali metal oxides in an amount of at least 2 wt. %, more preferred at least 3 wt. %, more preferred at least 4 wt. %, more preferred at least 5 wt. %, more preferred at least 6 wt. %. Accordingly, it is preferred that the overall content of alkaline oxides is in the range of from 2 wt.-% to 35 wt.-%, preferably in the range of from 3 wt.-% to 30 wt.-%, etc.

Alkaline earth oxides such as MgO, CaO, SrO, BaO work as network modifiers and decrease the forming temperature of glass. These oxides can be added to adjust the CTE and Young's modulus of glass. Alkaline earth oxides have very important function that they can change refractive index of glass to meet special requirements. For example, MgO can decrease the refractive index of glass and BaO can increase the refractive index. The weight content of alkaline earth oxides in the glass composition should preferably not be higher than 40 wt. %, preferably not higher than 30 wt.-%, preferably not higher than 25 wt.-%, also preferably not higher than 20 wt.-%, more preferably not higher than 15 wt.-%, more preferably not higher than 13 wt.-%, more preferably not higher than 12 wt.-%. Some variants of glasses can comprise alkaline earth oxides of at most 10 wt.-%, preferably of at most 5 wt.-%, more preferably of at most 4 wt.-%. If the amount of alkaline earth oxides is too high, chemical toughening performance may be deteriorated. A lower limit for alkaline earth oxides can be 1 wt. %, 13
14 or 5 wt. %. Moreover, the crystallization tendency may be increased if the amount of alkaline earth oxides is too high. Some advantageous variants can also be free of alkaline earth oxides.

Some transition metal oxides in glass, such as ZnO and $ZrO_2$, may have similar function like alkaline earth oxides and may be comprised in some embodiments. Other transition metal oxides, such as $Nd_2O_3$, $Fe_2O_3$, CoO, NiO, $V_2O_5$, $MnO_2$, $TiO_2$, CuO, $CeO_2$, and $Cr_2O_3$, work as coloring agent to make glass with specific optical or photonic functions, for example, color filter or light convertor. $As_2O_3$, $Sb_2O_3$, $SnO_2$, $SO_3$, Cl and/or F could be also added as refining agents in an amount of from 0 to 2 wt. %. Rare earth oxides could also be added to add magnetic or photonic or optical functions to the glass sheet in an amount of 0 to 5 wt. %.

In the following, preferred compositions for the glass of the glass disk 1 are disclosed. The compositions refer to the state of the glass before chemical toughening.

In one embodiment, the ultrathin flexible glass is an alkali metal aluminosilicate glass comprising the following components in the indicated amounts (in wt. %):

| Component | (wt. %) |
|---|---|
| $SiO_2$ | 40-75 |
| $Al_2O_3$ | 10-30 |
| $B_2O_3$ | 0-20 |
| $Li_2O + Na_2O + K_2O$ | 4-30 |
| $MgO + CaO + SrO + BaO + ZnO$ | 0-15 |
| $TiO_2 + ZrO_2$ | 0-15 |
| $P_2O_5$ | 0-10 |

Optionally, coloring oxides can be added, such as $Nd_2O_3$, $Fe_2O_3$, CoO, NiO, $V_2O_5$, $MnO_2$, CuO, $CeO_2$, $Cr_2O_3$, $As_2O_3$, $Sb_2O_3$, $SnO_2$, $SO_3$, Cl and/or F could be also added as refining agents in an amount of from 0 to 2 wt. %. Rare earth oxides could also be added to add magnetic or photonic or optical functions to the glass sheet in an amount of 0 to 5 wt. %.

The alkali metal aluminosilicate glass of the above disclosed composition preferably comprises the following components in the indicated amounts (in wt.-%):

| Component | (wt.-%) |
|---|---|
| $SiO_2$ | 50-70 |
| $Al_2O_3$ | 10-27 |
| $B_2O_3$ | 0-18 |
| $Li_2O + Na_2O + K_2O$ | 5-28 |
| $MgO + CaO + SrO + BaO + ZnO$ | 0-13 |
| $TiO_2 + ZrO_2$ | 0-13 |
| $P_2O_5$ | 0-9 |

Again, coloring oxides can be optionally added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

Most preferably, according to a refinement of the above-described composition, the alkali metal aluminosilicate glass of the invention comprises the following components in the indicated amounts (in wt. %):

| Components | (wt. %) |
|---|---|
| $SiO_2$ | 55-68 |

-continued

| Components | (wt. %) |
|---|---|
| $Al_2O_3$ | 10-27 |
| $B_2O_3$ | 0-15 |
| $Li_2O + Na_2O + K_2O$ | 4-27 |
| $MgO + CaO + SrO + BaO + ZnO$ | 0-12 |
| $TiO_2 + ZrO_2$ | 0-10 |
| $P_2O_5$ | 0-8 |

According to a further embodiment, the ultrathin flexible glass of the glass disk 1 or glass article 10, respectively, is a soda lime glass. The soda lime glass may in particular comprise the following components in the indicated amounts (in wt. %):

| Component | (wt. %) |
|---|---|
| $SiO_2$ | 40-81 |
| $Al_2O_3$ | 0-10 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 |

More specifically, the soda lime glass of this invention preferably comprises the following components in the indicated amounts (in wt. %):

| Component | (wt. %) |
|---|---|
| $SiO_2$ | 40-81 |
| $Al_2O_3$ | 0-6 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 |

According to a further refinement, the soda lime glass comprises the following components in the indicated amounts (in wt. %):

| Component | (wt. %) |
|---|---|
| $SiO_2$ | 50-81 |
| $Al_2O_3$ | 0-8 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

More preferred, the soda lime glass comprises the following components in the indicated amounts (in wt. %):

| Component | (wt. %) |
|---|---|
| $SiO_2$ | 50-81 |
| $Al_2O_3$ | 0-5 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

More specific, the soda lime glass comprises the following components in the indicated amounts (in wt. %):

| Component | (wt. %) |
|---|---|
| SiO$_2$ | 55-76 |
| Al$_2$O$_3$ | 0-6 |
| B$_2$O$_3$ | 0-5 |
| Li$_2$O + Na$_2$O + K$_2$O | 5-25 |
| MgO + CaO + SrO + BaO + ZnO | 5-20 |
| TiO$_2$ + ZrO$_2$ | 0-5 |
| P$_2$O$_5$ | 0-2 |

Most preferred, the soda lime glass of the invention comprises the following components in the indicated amounts (in wt. %):

| Component | (wt. %) |
|---|---|
| SiO$_2$ | 55-76 |
| Al$_2$O$_3$ | 0-5 |
| B$_2$O$_3$ | 0-5 |
| Li$_2$O + Na$_2$O + K$_2$O | 5-25 |
| MgO + CaO + SrO + BaO + ZnO | 5-20 |
| TiO$_2$ + ZrO$_2$ | 0-5 |
| P$_2$O$_5$ | 0-2 |

Optionally, coloring oxides can be added to all embodiments of the soda-lime glass with the compositional ranges as specified above. The coloring oxides may include Nd2O3, Fe2O3, CoO, NiO, V2O5, MnO2, CuO, CeO2, Cr2O3. 0-2 wt. % of As2O3, Sb2O3, SnO2, SO3, Cl and/or F could be also added as refining agents. 0-5 wt. % of rare earth oxides could also be added to add magnetic or photonic or optical functions to the glass sheet.

In one embodiment, the ultrathin flexible glass is a lithium aluminosilicate glass comprising the following components in the indicated amounts (in wt. %):

| Component | (wt.-%) |
|---|---|
| SiO$_2$ | 55-69 |
| Al$_2$O$_3$ | 15-25 |
| Li$_2$O | 3-5 |
| Na$_2$O + K$_2$O | 0-30 |
| MgO + CaO + SrO + BaO | 0-5 |
| ZnO | 0-4 |
| TiO$_2$ | 0-5 |
| ZrO$_2$ | 0-5 |
| TiO$_2$ + ZrO$_2$ + SnO$_2$ | 2-6 |
| P$_2$O$_5$ | 0-8 |
| F | 0-1 |
| B$_2$O$_3$ | 0-2 |

The lithium aluminosilicate glass of the invention more preferably comprises the following components in the indicated amounts (in wt. %):

| Component | (wt.-%) |
|---|---|
| SiO$_2$ | 57-66 |
| Al$_2$O$_3$ | 15-23 |
| Li$_2$O | 3-5 |
| Na$_2$O + K$_2$O | 3-25 |
| MgO + CaO + SrO + BaO | 1-4 |
| ZnO | 0-4 |
| TiO$_2$ | 0-4 |
| ZrO$_2$ | 0-5 |
| TiO$_2$ + ZrO$_2$ + SnO$_2$ | 2-6 |
| P$_2$O$_5$ | 0-7 |
| F | 0-1 |
| B$_2$O$_3$ | 0-2 |

Most preferably, the lithium aluminosilicate glass of the invention comprises the following components in the indicated amounts (in wt. %):

| Component | (wt.-%) |
|---|---|
| SiO$_2$ | 57-63 |
| Al$_2$O$_3$ | 15-22 |
| Li$_2$O | 3.5-5 |
| Na$_2$O + K$_2$O | 5-20 |
| MgO + CaO + SrO + BaO | 0-5 |
| ZnO | 0-3 |
| TiO$_2$ | 0-3 |
| ZrO$_2$ | 0-5 |
| TiO$_2$ + ZrO$_2$ + SnO$_2$ | 2-5 |
| P$_2$O$_5$ | 0-5 |
| F | 0-1 |
| B$_2$O$_3$ | 0-2 |

Optionally, coloring oxides can be added to all embodiments of lithium-aluminosilicate glasses, such as Nd$_2$O$_3$, Fe$_2$O$_3$, CoO, NiO, V$_2$O$_5$, MnO$_2$, CuO, CeO$_2$, Cr$_2$O$_3$. 0-2 wt % of As$_2$O$_5$, Sb$_2$O$_3$, SnO$_2$, SO$_3$, Cl and/or F could be also added as refining agents. 0-5 wt % of rare earth oxides could also be added to impart magnetic or photonic or optical functions to the glass sheet.

In one embodiment, the ultrathin flexible glass is a borosilicate glass comprising the following components in the indicated amounts (in wt. %):

| Composition | (wt.-%) |
|---|---|
| SiO$_2$ | 60-85 |
| Al$_2$O$_3$ | 0-10 |
| B$_2$O$_3$ | 5-20 |
| Li$_2$O + Na$_2$O + K$_2$O | 2-16 |
| MgO + CaO + SrO + BaO + ZnO | 0-15 |
| TiO$_2$ + ZrO$_2$ | 0-5 |
| P$_2$O$_5$ | 0-2 |

The borosilicate glass of the invention preferably comprises the following components in the indicated amounts (in wt. %):

| Composition | (wt.-%) |
|---|---|
| SiO$_2$ | 63-84 |
| Al$_2$O$_3$ | 0-8 |
| B$_2$O$_3$ | 5-18 |
| Li$_2$O + Na$_2$O + K$_2$O | 3-14 |
| MgO + CaO + SrO + BaO + ZnO | 0-12 |
| TiO$_2$ + ZrO$_2$ | 0-4 |
| P$_2$O$_5$ | 0-2 |

The borosilicate glass of the invention more preferably comprises the following components in the indicated amounts (in wt %):

| Composition | (wt.-%) |
|---|---|
| SiO$_2$ | 63-83 |
| Al$_2$O$_3$ | 0-7 |
| B$_2$O$_3$ | 5-18 |
| Li$_2$O + Na$_2$O + K$_2$O | 4-14 |
| MgO + CaO + SrO + BaO + ZnO | 0-10 |
| TiO$_2$ + ZrO$_2$ | 0-3 |
| P$_2$O$_5$ | 0-2 |

Optionally, coloring oxides can be added to the borosilicate glasses having the above disclosed compositional ranges. Coloring oxides may be $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to impart magnetic or photonic or optical functions to the glass sheet.

It is preferred to use direct hot-forming such as down draw or overflow fusion method. A redraw method is also advantageous. Polishing down or etching a thicker glass disk to obtain the thin glass disk in which then the damage zones are introduced, is a further option.

For example, the down-draw/overflow fusion method can produce glass disks with pristine or fire-polished surfaces with roughness Ra less than 5 nm, preferred less than 2 nm, even preferred less than 1 nm. The thickness can also be precisely controlled ranging from 5 μm and 500 μm. The low thickness provides a high glass flexibility.

Further, it is possible to produce ultrathin glass with pristine surface by a float process. This method is economical and suitable for mass production too, but the glass produced by float has one side as tin-side which is different from the other side. The difference between two sides may eventually cause warp of the glass after chemical toughening, and may affect printing or coating because the two sides faces have different surface energy. Another, less preferable variant is to produce the glass disk 1 by sawing the disk 1 out of a thick glass ingot, bar, or block etc.

The strengthening, as called as toughening, can be done by immersing glass into melt salt bath with potassium ions or cover the glass by potassium ions or other alkaline metal ions contained paste and heated at high temperature at certain time. The alkaline metal ions with larger ion radius in the salt bath or the paste exchange with alkaline metal ions with smaller radius in the glass article, and surface compressive stress is formed due to ion exchange.

A chemically toughened glass disk 1 and likewise the glass article 10 is obtained by chemically toughening. The toughening process may be done by immersing the ultrathin glass article into a salt bath which contains monovalent ions to exchange with alkali ions inside the glass. The monovalent ions in the salt bath have a radius larger than that of the alkali ions inside the glass. A compressive stress to the glass is built up after ion-exchange due to larger ions squeezing in the glass network. After the ion-exchange, strength and flexibility of the ultrathin glass are surprisingly and significantly improved. In addition, the CS induced by chemical toughening improves the bending properties of the toughened glass article and may increase scratch resistance of glass Typically, a molten salt is used for chemical toughening that contains $Na^+$- or $K^+$-ions or a mixture of these. Commonly used salts are $NaNO_3$, $KNO_3$, NaCl, KCl, $K_2SO_4$, $Na_2SO_4$, $Na_2CO_3$, and $K_2CO_3$. Additives like NaOH, KOH and other sodium or potassium salts may be also used for better controlling the speed of ion-exchange, CS and DoL during chemical toughening. Further, an $Ag^+$-containing or $Cu^{2+}$-containing salt bath could be used to add anti-microbial function to ultrathin glass.

The chemical toughening is not limited to a single step process. It can also include multi steps of immersing the glass disk into salt baths with alkaline metal ions of various concentrations to reach better toughening performance. Thus, the chemically toughened glass article according to the invention can be toughened in one step or in the course of several steps, e.g., two steps.

The chemically toughened glass article according to the invention can have just one surface (first surface) where a compressive stress region extending from the first surface to a first depth in the glass article exists, wherein the region is defined by a compressive stress. In this case the glass article comprises only one toughened side. Preferably the glass article according to the invention also comprises a second surface—opposite to the first surface—where a second compressive stress region extending from the second surface to a second depth in the glass article (DoL) exists, the region is defined by a compressive stress wherein the surface compressive stress (CS) at the second surface is at least 100 MPa. This preferred glass article is toughened on both sides to balance the compressive forces. As the glass disk 1 is toughened with the channels 70 inserted, the compressive stress region imparted by the chemical toughening also extends at least partly along the channels 70, or openings 71, respectively, with the compressive stress having a direction component along the openings 71.

Generally, etching may be performed in acidic, particularly aqueous solutions comprise one or more of the following HF, $H_2SO_4$, HCl, $NH_4HF_2$, citric acid. These acidic solutions can be combined with further pH<7 solutions. The concentration of hydrogen ions in the acidic solution can be less than 25 mol/L, preferably less than 5 mol/L, more preferably less than 1 mol/L and most preferably less than 0.1 mol/L. These etching conditions have proven to be particularly advantageous with the further below mentioned glass compositions. It becomes immediately clear that these etching conditions can also be applied to other glass types or that other etching conditions can also be advantageous, dependent on the specific requirements. In addition, it can also be done by etching with alkaline solution comprise one or more of the following LiOH, NaOH, KOH in aqueous solution. The concentration of OH ions in the alkaline solution can be less than 25 mol/L, preferably less than 20 mol/L, more preferably less than 15 mol/L and most preferably less than 10 mol/L. The embodiments of etching with acidic etchants and alkaline etchants may be alternatively applied but can also be combined, e.g., by subsequently etching with different etchants.

Compressive stress (CS) also depends on the composition of the glass. A higher content of $Al_2O_3$ can be helpful to achieve higher compressive stress. To reach balanced glass hot-forming capability and chemical toughening performance, the surface compressive stress is preferably below 1200 MPa. However, after toughening, the ultrathin glass of the glass disk 1 or glass article 10 should have a compressive stress high enough to achieve high strength. Therefore, preferably, the surface compressive stress is equal to or more than 100 MPa, preferably equal to or more than 200 MPa, more preferably equal to or more than 300 MPa, also preferably equal to or more than 400 MPa, further preferably equal to or more than 500 MPa. In especially preferred embodiments surface compressive stress is equal to or more than 600 MPa, further preferably equal to or more than 700 MPa, more preferably equal to or more than 800 MPa.

The DoL also depends on the glass composition, but it can increase nearly infinitely with increased toughening time and toughening temperature. A defined DoL is advantageous to ensure the stable strength of toughened glass, but a too high DoL increases the self-breakage probability and the strength performance when the ultrathin glass article is under compressive stress, so DoL should be preferably controlled.

According to an advantageous embodiment of the invention, the toughened glass article 10 has a CT (central tension) of less than or equal to 1000 MPa, more preferably less than or equal to 700 MPa, more preferably less than or equal to 300 MPa, more preferably less than or equal to 200 MPa. Some advantageous embodiments can have a CT of less than or equal to 65 MPa. Other advantageous embodiments can have a CT of less than or equal to 45 MPa. Some variants may even have a CT of less than or equal to 25 MPa.

Generally. CS, DoL and CT depend on the glass composition (glass type), glass thickness and the toughening conditions.

As exemplary shown in FIG. 2, the glass article 10 can be additionally coated, e.g., for anti-reflection-, anti-scratch-, anti-fingerprint-, anti-microbial-, anti-glare-properties, or as a wavelength filter. Coatings may have combined functionality, e.g., by applying multiple layers or different coatings on the side faces 2, 3.

The glass article 10 can be used for example as a coating substrate, display substrate or protection cover, a finger print sensor cover, a general sensor substrate or cover, a cover glass for consumer electronics, a protective cover of a display or for other surfaces, especially bended surfaces. Moreover, the glass article 10 may also be used as a display substrate and cover, for fragile sensors, as fingerprint sensor module substrate or cover, for a semiconductor package, as thin film battery substrate and cover, for foldable displays, as camera lens cover. In specific embodiments, the glass articles may be used as cover film for resistance screens, and expendable protective films for display screens, cell phones, cameras, gaming gadget, tablet, laptops, TV, mirror, windows, aviation widows, furniture, and white goods.

The invention is especially suitable for being used in flexible electronic devices providing thin, lightweight and flexible properties (e.g., curved displays, wearable devices). Such flexible devices also require flexible substrates e.g., for holding or mounting components. In addition flexible displays with high contact resistance and small bending radii are possible.

Figure 4:
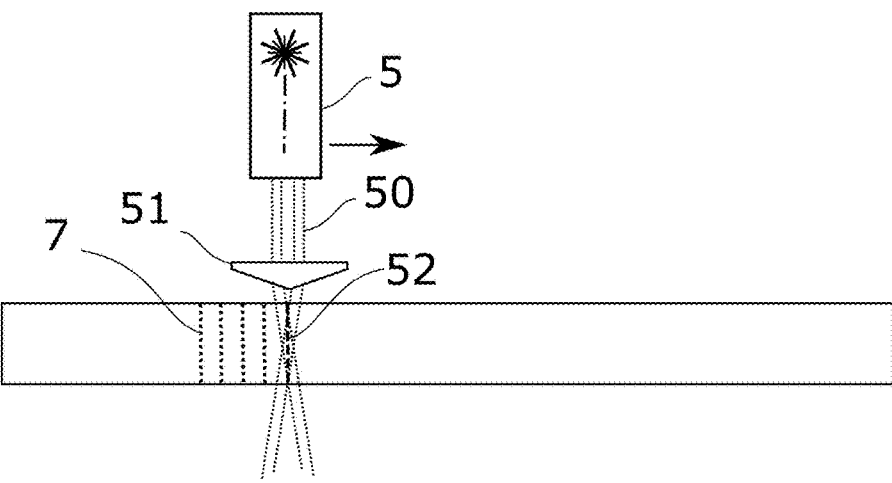
FIG. 4 shows an arrangement to introduce damage regions into the glass disk.

In the following, method steps to produce a structured glass disk 1 and a glass article 10 are explained. First, a glass disk 1 is provided having a thickness of at most 400 μm. Providing the glass disk 1 may also include mechanical and chemical slimming or etching, the hot forming of the disk 1, e.g., by redrawing or melting a glass composition and producing a glass disk using a drawing process such as down-drawing or overflow-fusion. As shown in FIG. 4, a laser beam 50 of an ultrashort pulsed laser 5 is directed and focused onto the glass disk 1. The laser beam 50 has a wavelength at which the glass of the glass disk 1 is transparent. Accordingly, the laser beam 50 can traverse the glass disk 1. By means of a lens 51, the laser beam 50 is focused to produce an elongated focus 52 within the glass disk 1. A suitable lens is a so called axicon lens. This lens basically has a conically shaped refractive surfaces so that parallel light rays are refracted to directions with invariant polar angle. The laser beam is sufficiently intense to produce a damage zone within the glass. In particular, the damage zone may be generated due to optical breakdown and/or plasma formation within the glass. Ideally, the damage zone 7 extends from one side face 2 across the glass up to the opposite side face 3.

The laser beam 50 is moved relative to the glass disk 1 to produce a sequence of damage zones 7. The movement follows a ring-shaped path as also shown in FIG. 1 so that the plurality damage zones 7 encircle an area of the glass disk 1 that forms a die or workpiece 9. Then, the glass disk 1 is exposed to an etchant. This not only etches the disk surface. In particular, the etchant, preferably an aqueous etching solution can penetrate into the damage zones 7 so that the glass is etched along these zones. Accordingly, the damage zones 7 are widened by the etching to form channels 70 across the glass disk. In some embodiments, the channels 70 may be openings connecting the opposite side faces of the glass disk 1. The result is shown in the perspective view of FIG. 5. As depicted, the channels may be widened so far that adjacent channels 70 combine. However, generally and without restriction to the example of FIG. 5, at least some connecting sections 17 remain between the channels 70 to retain the workpiece 9 in the glass disk 1. According to a preferred embodiment of the method, the glass surface is etched off by 0.1 to 5 μm. Accordingly, the thickness of the glass disk 1 is reduced due to the etching by 0.2 μm to 10 μm. The etching may be only locally, e.g., if parts of the glass disk 1 are covered to prevent exposure of the glass to the etchant. Typically, the diameter of the channels 70 then will be in a similar range. Thus, according to an embodiment of the glass disk 1, the channels 70 have a diameter in the range of 0.1 to 10 μm.

After etching, a chemical toughening of the glass disk 1 together with the at least one workpiece 9 is performed. Generally, the chemically toughening process comprises an ion-exchange process. For mass production it will be favorable if the ion-exchange process comprises immersing the glass disk 1 into a salt bath containing monovalent cations. Preferably the monovalent cations are potassium ions and/or soda ions.

Further it is advantageous if the glass disk 1 is immersed in the salt bath at a temperature between 340° C. and 480° C. for a time interval ranging from 30 seconds to 48 hours.

For some glass types it may be preferred if the chemical toughening comprises two consecutive toughening steps, wherein the first step comprises toughening with a first toughening agent and the second step comprises toughening with a second toughening agent. Preferably the first toughening agent and the second toughening agent comprise or consist of KNO3 and/or NaNO3 and/or mixtures thereof.

Optionally, coating or laminating steps may follow.

Then the workpiece 9 is separated to form a glass article 10 as exemplary shown in FIG. 2.

To reduce the risk that the workpiece breaks in an uncontrolled manner upon separation, the connecting sections 17 may be kept so narrow that the glass within these sections is under compressive stress, or at least, that there is no tensile stress at the location of separation. To ensure this, it is advantageous to choose the distance of the damage zones 7, the diameter of the channels 70 and the DoL so that the width 19 of the connecting sections 17 between two channels 70 or openings 71, respectively, is less than twice the DoL. Thus, the laser pre-scoring, the etching and the chemical toughening so that the width 19 of the connecting sections 17 is at most twice the depth of the ion exchanged layer in the glass as produced by the chemical toughening. This way, at least at the waist portion of the connecting sections 17 the ion exchange layers extending from the channels 70 into the glass converge at the waist portion, thereby ensuring a compressive stress even in the bulk of the sections 17.

TABLE 1 shows the compositions of several typical embodiments direct hot-forming thin composition of different glass types (types 1-5) which are chemically toughenable.

TABLE 1

| Composition (wt %) | Type 1 | Type 2 | Type 3 | Type 4 | Type 5 |
|---|---|---|---|---|---|
| $SiO_2$ | 61 | 62 | 64 | 70 | 80 |
| $Al_2O_3$ | 17 | 18 | 4 | — | 3 |
| $Li_2O$ | — | 5 | — | — | — |
| $Na_2O$ | 12 | 10 | 6 | 10 | 4 |
| $K_2O$ | 4 | 1 | 7 | 8 | — |
| MgO | 4 | | | | |
| CaO | — | 1 | — | 6 | — |
| BaO | — | — | — | 2.5 | — |
| ZnO | — | — | 6 | 4 | — |
| $ZrO_2$ | 2 | 3 | — | — | — |
| $B_2O_3$ | — | 1 | 8 | 0.1 | 12 |
| $TiO_2$ | — | — | 4 | — | — |

Specimens of the different glass types were produced in a down draw process and chemically toughened to form ultrathin chemically toughened glass articles 10. Each ultrathin glass article has a first surface 2 and a second surface 3. In the embodiments shown each sample representing a glass article 10 is toughened on both sides. So there is a compressive stress region with a certain depth (DoL) on each side of the glass article.

COMPARATIVE EMBODIMENTS

A specimen of glass type 1 with the size of 100*100*0.21 mm was toughened at 390° C. for 20 min and then cut into a series of separate rectangular size of 10*10 mm with four R1 mm corners by a femtosecond laser with Bessel beam in a maximum power of 8 W. After cutting, the glass article was cleaned. CS and DoL of the glass dies were measured with FSM 6000. The CS and DoL are 840 MPa, and 10 μm, respectively.

Figures 5, 6, 8:
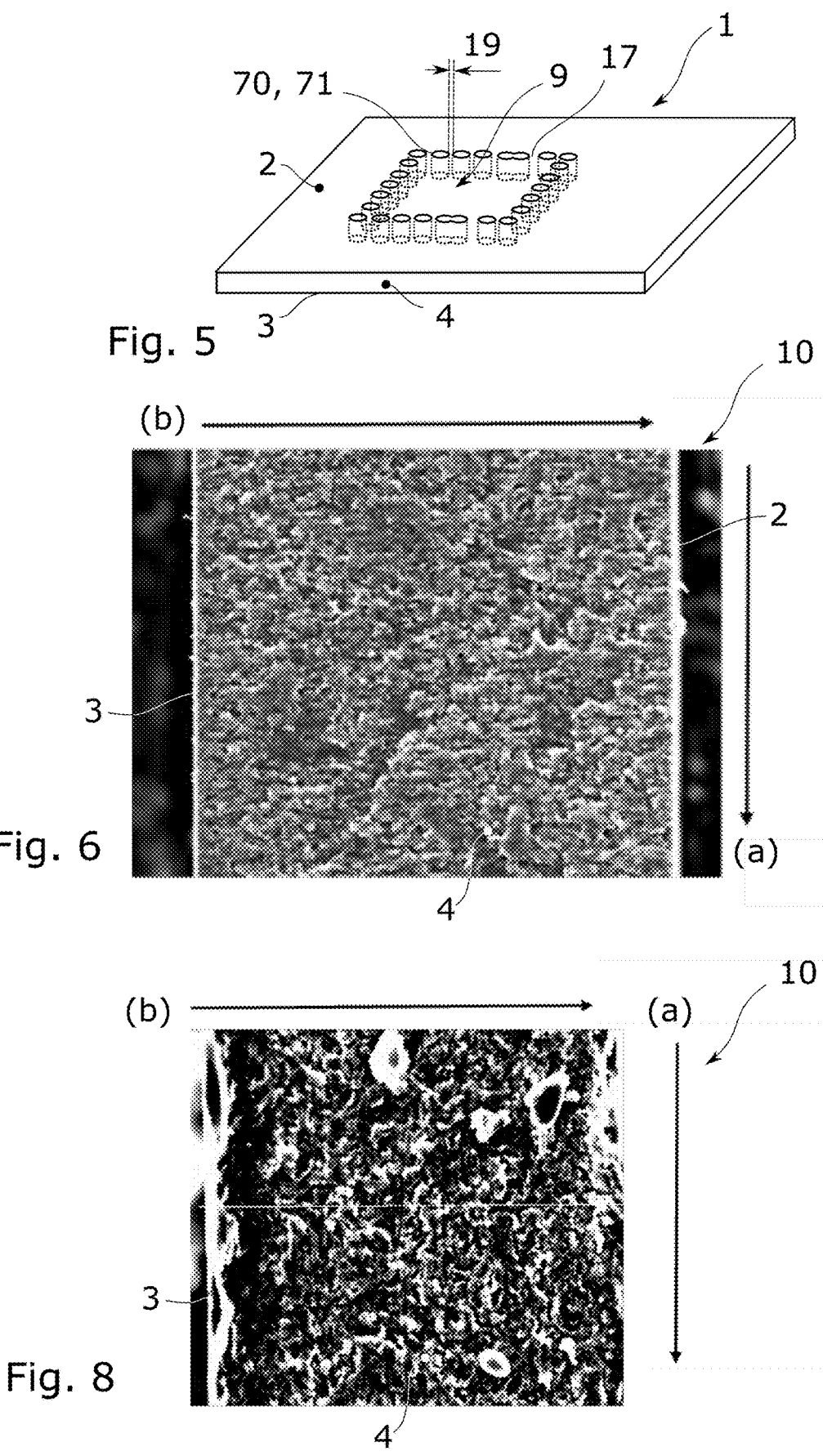
FIG. 5 shows a perspective view of a structured glass disk.
FIG. 6 is an SEM micrograph of the edge of a glass article.
FIG. 8 is an SEM micrograph of the edge of a glass article.

A SEM micrograph of the edge of the specimen is shown in FIG. 6.

The K/Si ion distribution on the cross section was scanned along two directions, denoted (a) and (b). The scanning was performed using EDS (Energy-dispersive X-ray spectroscopy). Scanning direction (a) runs along the edge, whereby the scanning path is approximately centered on the edge surface 4. Scanning direction (b) points from one side face 2 towards the opposite side face so that the scanning path runs across the edge surface from one side face to the other side face.

Figures 7A, 7B:
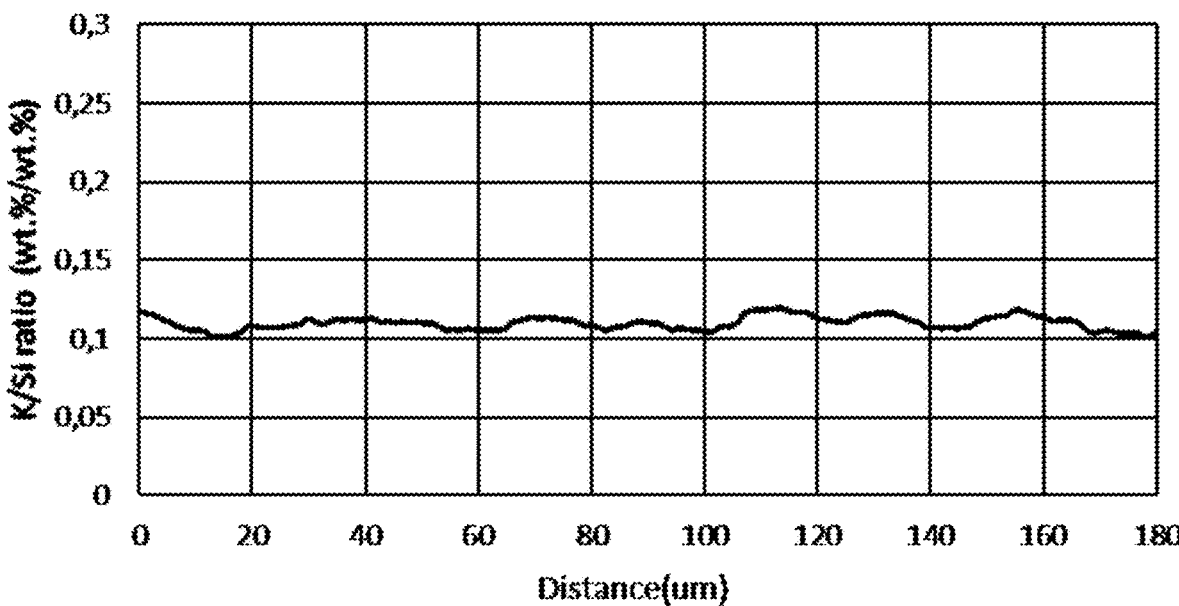
FIGS. 7*a* and 7*b* show diagrams of the ratio of element contents at the glass surface along the different directions of FIG. 6.

The data are shown in FIGS. 7a and 7b, which depict the measured values of the ratio of the K and Si contents given in weight %. The diagrams are named in correspondence to the scanning directions shown in FIG. 6—namely with FIG. 7a depicting scanning direction (a) in FIG. 6 and FIG. 7b depicting scanning direction (b) in FIG. 6.

From FIG. 7b it can be observed that the relative content of potassium ions decays from the position near the side face towards the center of the edge surface 4. This is in accordance with the typical ions diffusion profile of toughened glass sheets.

Another specimen of glass type 1 with the size of 10*10*0.21 mm was mechanically edge grinded and then toughened at 390° C. for 2 h. CS and DoL of the glass dies were measured with FSM 6000. The CS and DoL are 840 MPa, and 21 μm, respectively.

Figure 9A:
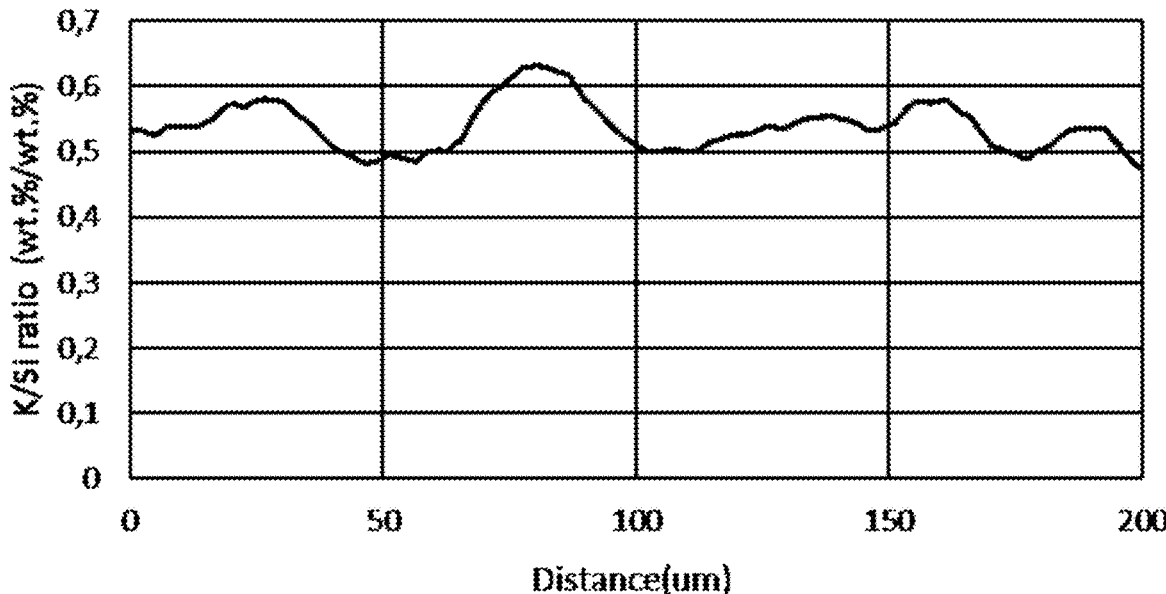
FIGS. 9*a* and 9*b* show diagrams of the ratio of element contents at the glass surface along the different directions of FIG. 8.
Figure 9B:
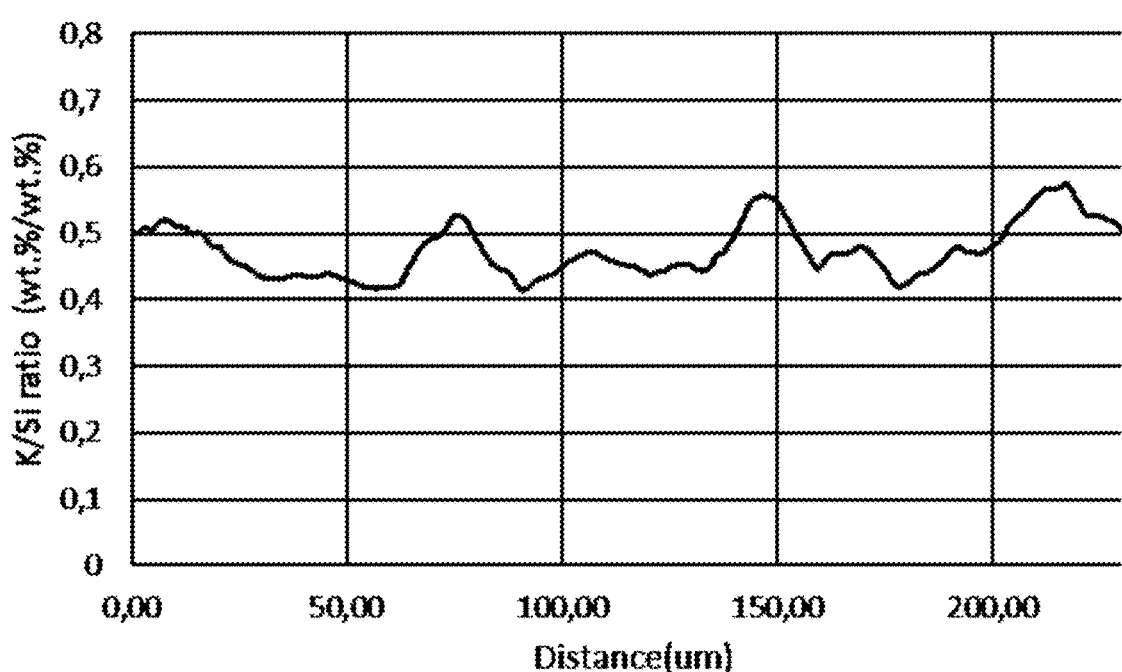

FIG. 8 shows a SEM micrograph of the edge surface 4 with the scanning directions (a) and (b) for the EDS measurements of the K/Si distribution. FIGS. 9a and 9b show the measured course of the K/Si ratio similar to FIGS. 7a and 7b.

Figure 10:
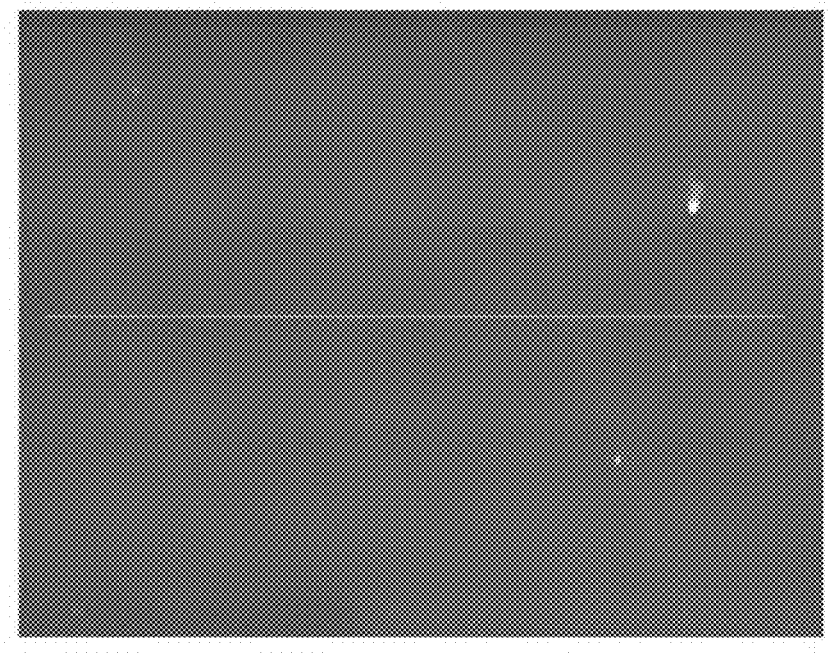
FIG. 10 is an SEM micrograph of a side face of a glass article.

It can be observed that the potassium ions are more or less uniformly distributed on the whole edge surface 4 which follows the typical ions diffusion profile of edge grinded and then toughened glass sheets. To compare the K/Si distribution across the side face, the K/Si distribution on the side face 2 was scanned. FIG. 10 shows the SEM micrograph of the surface with the scanning path as a white line.

Figure 11:
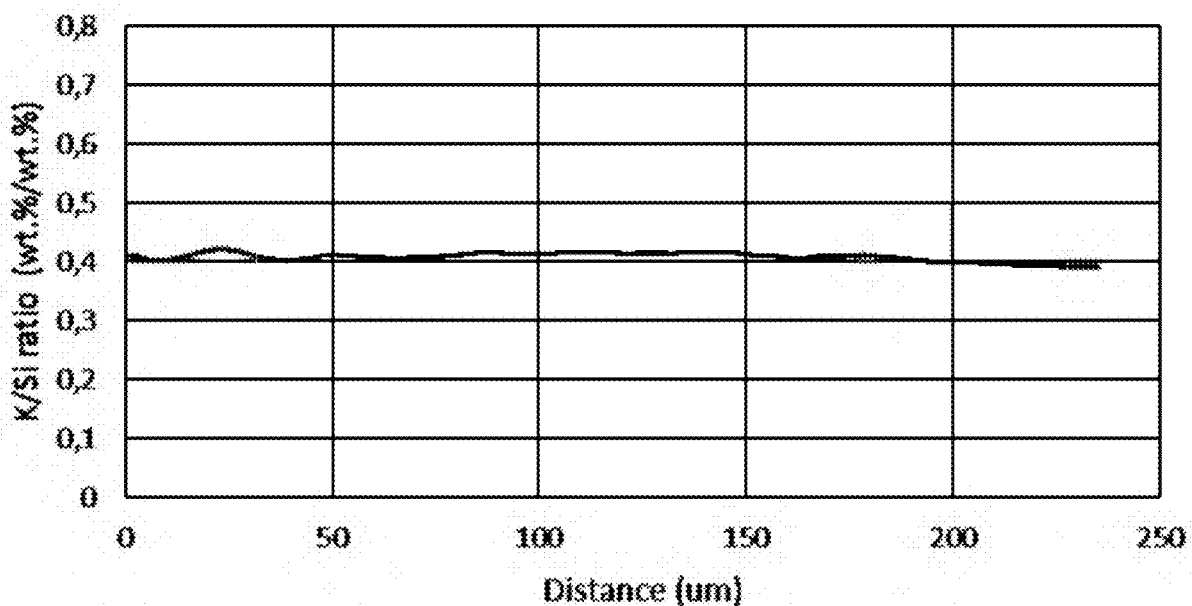
FIG. 11 shows a diagrams of the ratio of element contents at the side face of FIG. 10.

The measured K/Si ratios along this path are shown in the diagram of FIG. 11. As expected, the K/Si ratio is nearly constant along this path.

Embodiment 1—Glass Type 1

A glass disk of glass type 1 as specified in TABLE 1 with the size of 100*100*0.21 mm was pre-scored with an ultrashort pulsed laser into a series of ring-shaped paths 55 having the shape of separate rectangles of 10*10 mm with four rounded corners with radius 1 mm. For scoring a femtosecond laser with a Bessel beam and a maximum power of 5 W was used. The as-pre-scored structured glass disk was then etched using a mixture of 1% $HNO_3$+1% HF for 60 s. Then the glass article was toughened in a $KNO_3$ salt bath at a temperature of 390° C. for 2 h. After ion-exchange, the glass disk was cleaned and the scored glass dies were separated by hand to obtain sample glass articles 10. CS and DoL of the glass articles were measured with FSM 6000. The CS and DoL are 840 MPa, and 21 um, respectively.

Figures 12, 13A, 13B:
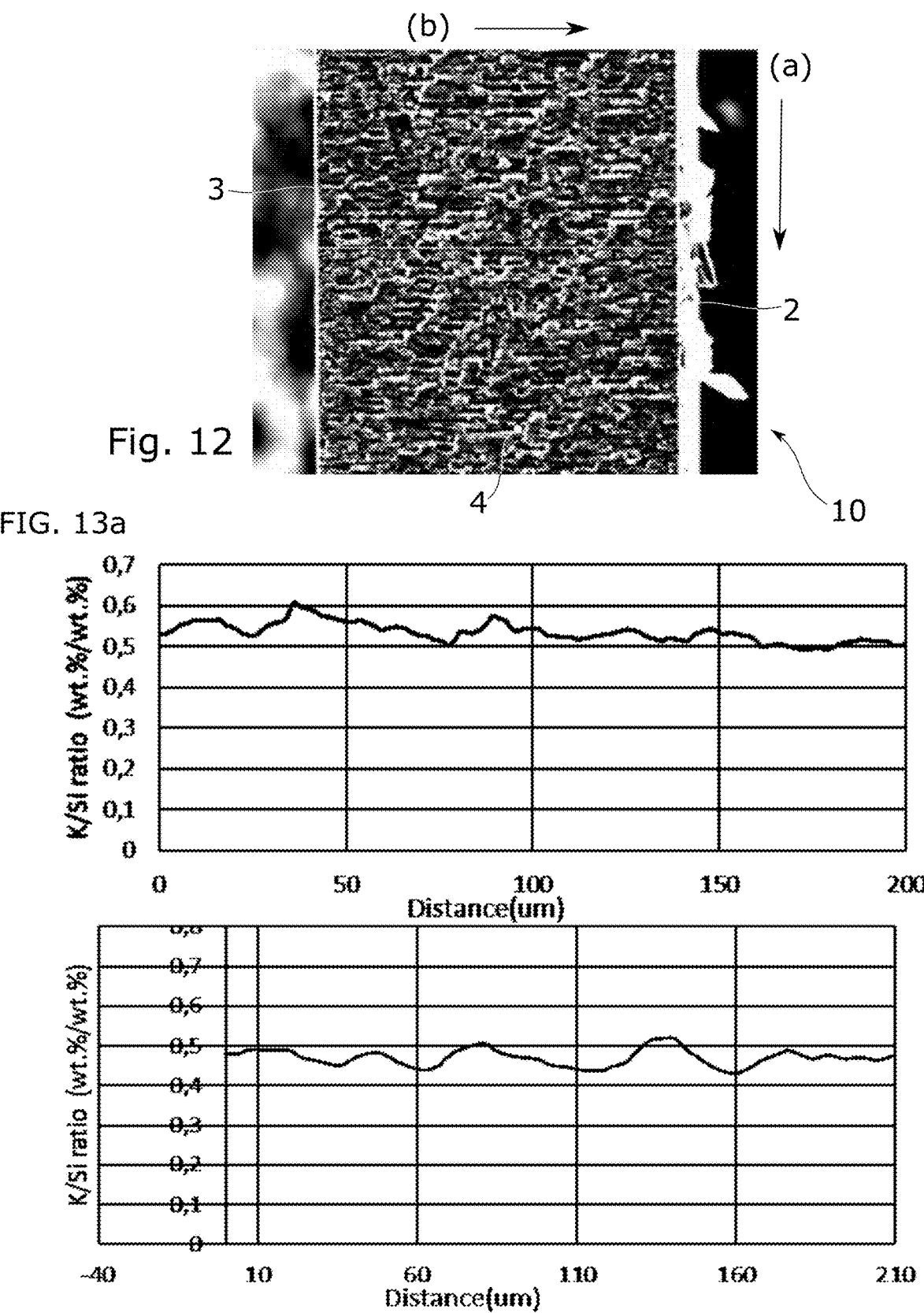
FIG. 12 is an SEM micrograph of the edge of a glass article.
FIGS. 13*a* and 13*b* show diagrams of the ratio of element contents at the glass surface along the different directions of FIG. 12.

FIG. 12 shows a SEM micrograph of the edge surface of a glass article 10 with scanning directions (a) and (b). The K/Si ion distribution on the edge surface 4 was scanned along the directions (a) and (b) and are illustrated in FIGS. 13a and 13b, respectively.

It can be seen from FIG. 13b that the potassium ions are distributed over the whole surface of the cross section. This is due to an advantageous refinement of the method. According to this refinement, the potassium ions penetrate into the channels 70 so that an ion exchange is affected in inner regions of the glass disk 1 in vicinity of the channels 70 so as to form a compressive stress zone along the lined-up channels and thus at the edge surface of the glass article that is to be segregated from the glass disk 1. Thus, generally and without restriction to the example of FIGS. 12, 13a, and 13b, an embodiment of the method is provided, wherein alkali ions of an ion exchange bath into which the glass disk 1 is immersed, penetrate into the channels 70 and effecting an ion exchange in the glass surrounding the channels 70 in inner sections of the glass disk. In particular, the inner regions may be located deeper within the glass disk 1 than the depth of the ion exchange layer on the side faces 2, 3, or the depth of the compressive zone, respectively.

Due to the ion exchange deep within the disk, a glass article 10 may be obtained having an edge surface 4 with a ratio of the potassium content to the silicon content in a direction across the edge from one side face 2, 3 of the glass disk 1 towards the other side face (3, 2), the ratio fluctuating by less than a factor of 1.5.

Further, the glass article 10 distinguishes from a glass article with a grinded edge surface and chemical toughening after edge grinding (i.e., according to the comparative example of FIGS. 8, 9a, and 9b) in that the channels 70 are still visible in the edge surface 4. From the lined-up channels, elongated structures remain in the edge surface, the structures extending in a direction across the edge surface 4, i.e., in direction from one side face 2 to the other, opposed side face 3. In other words, the structures on the edge surface 4 have an anisotropy with a greater length in direction across the edge (in FIG. 12 the direction from left to right) compared to the direction along the edge (in FIG. 12 the direction from up to down).

Figure 16:
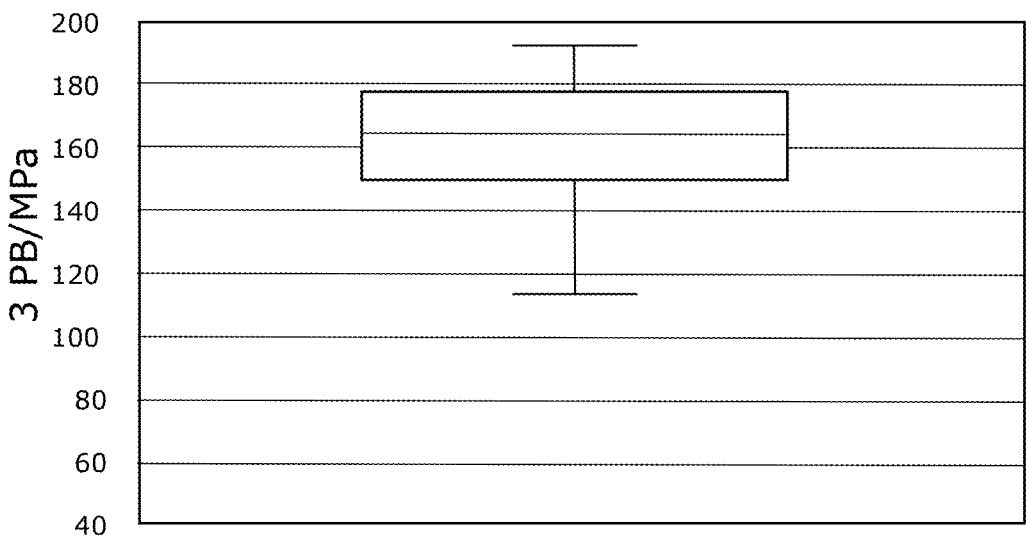
FIGS. 16 and 17 shows diagrams with 3 point bending strength values of glass samples.
Figure 17:
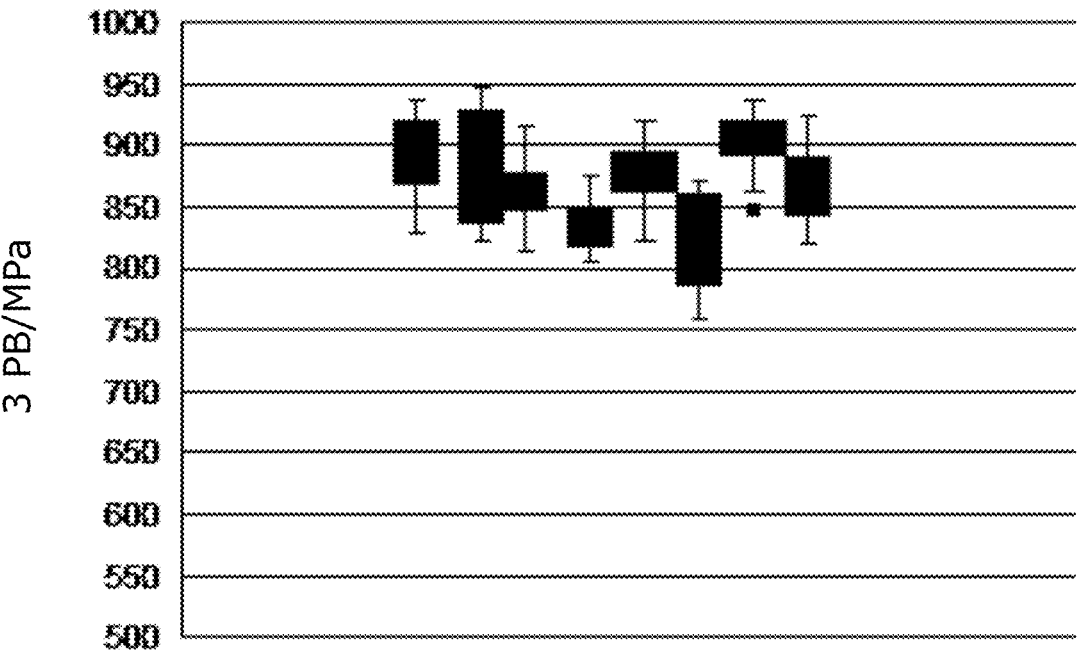

FIG. 16 shows the 3-point-bending-strength value of the glass article 10 according to the comparable example. In comparison, FIG. 17 shows the 3 point-bending-strength values for samples according to example 1. The 3-point bending strength was tested with a universal testing machine. The loading speed is 1 mm/min. The supporting span is 6 mm. 8 pcs 100*100*0.21 mm glass wafer were tested with the results as shown.

The main differences between the both examples are the duration of the chemical toughening, being shorter in case of the comparable example, and the sequence of the process steps. The pre-scoring and subsequent toughening together with a longer period for chemical toughening according to the method as described herein results in a toughness being about a factor of 5 higher for example 1 compared to the comparative example.

Embodiment 2

A disk of glass type 1 with the size of 400*300*0.05 mm was chemically slimmed via acids from the size of 400*300*0.21 mm sheet. The ultrathin glass was then pre-scored into a series of separate rectangular sized workpieces having a size of 20 mm. 70 mm with four rounded corners having an edge radius of 1 mm. The pre-scoring was performed by a femtosecond laser with Bessel beam in a maximum power of 6 W.

A disk of glass type 1 with the size of 400*300*0.07 mm was also tested. The glass sheet was produced by down-drawing. The ultrathin glass was then pre-scored with the laser to define a series of separate rectangular sized workpieces having a size of 20 mm-70 mm with four rounded corners having an edge radius of 1 mm. The pre-scoring was performed by a femtosecond laser with Bessel beam in a maximum power of 6 W.

Figures 14, 15A, 15B:
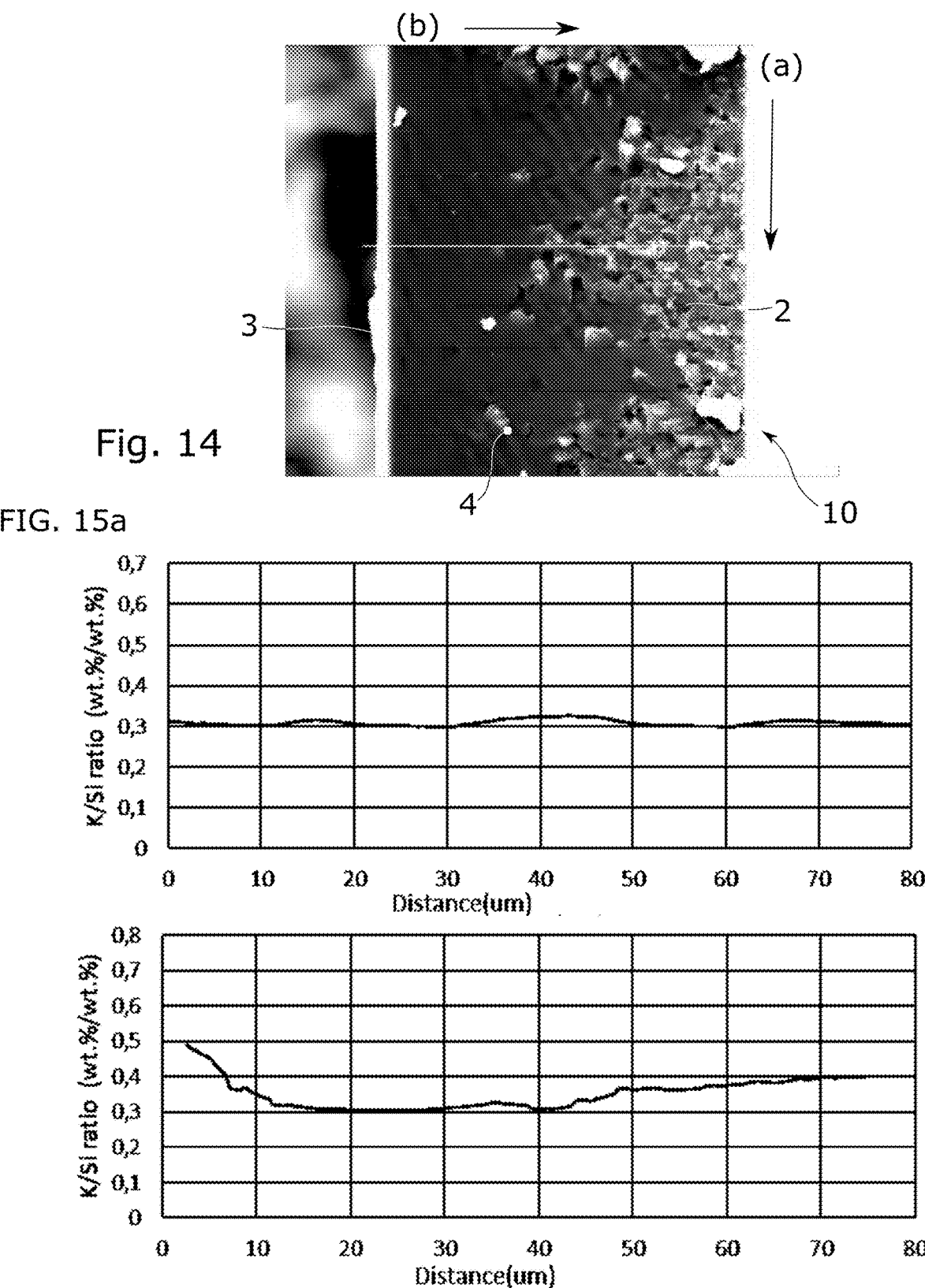
FIG. 14 is an SEM micrograph of the edge of a glass article.
FIGS. 15*a* and 15*b* show diagrams of the ratio of element contents at the glass surface along the different directions of FIG. 14.

FIG. 14 shows a SEM micrograph of the edge of the segregated glass article 10.

The K/Si ion distribution on the cross section of 0.07 mm pre-scored, etched and then toughened AS87 eco was scanned along directions (a) along the edge and across the edge from one side face to the other (direction (b)).

The EDS measurements along directions (a) and (b) are shown in FIGS. 15a and 15b, respectively. In this case, the channels produced by laser pre-scoring and etching does not result in channels which form openings after etching. The channels formed from the damage zones at least partly do not extend through the disk. Rather, the channels extend only half way through the glass disk 1. This way, the K/Si profile in direction (b) becomes somewhat asymmetric. Similarly, the micrograph of FIG. 14 shows a varying surface roughness across the edge surface 4 with the part adjacent to side face 2 having a higher roughness. Thus, according to one embodiment of the method and without restriction to the specific example of FIGS. 14, 15a, and 15b the damage zones 7 are introduced into the glass disk so that they end within the disk at a position between the side faces 2, 3 so that channels 70 in the form of blind holes are formed, in particular after etching.

Figure 18:
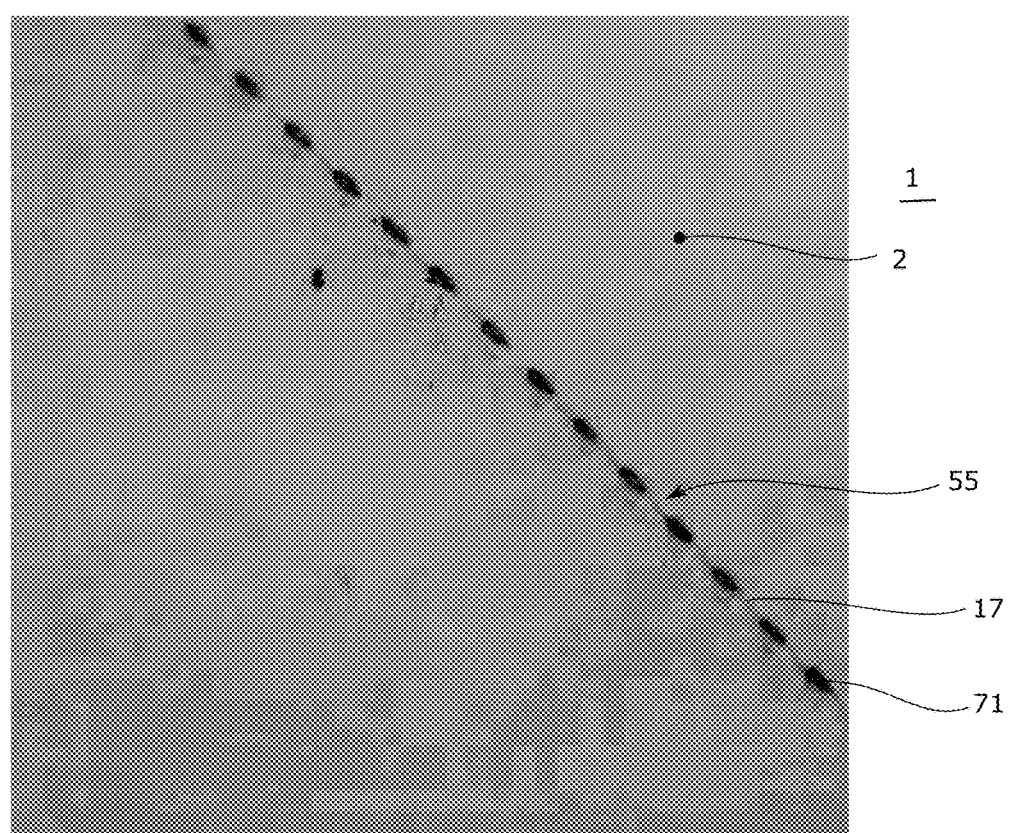
FIG. 18 shows a microscope photograph.

The as-pre-scored structured glass article was then etched by a mixture of 1% $HNO_3$+1% $NH_4HF_2$ for 20 s. FIG. 18 shows a microscope photomicrograph of the side face 2 of the glass article 1 with openings 71 produced by etching. The damage zones were introduced in groups of closely adjacent filaments, with larger gaps between the groups. By etching, the channels within the groups combine so that elongated openings are formed as visible in FIG. 18. The length of the openings 71 is about 3.7 μm. The connecting sections 17 between the openings 71 have a width of about 8.5 μm. Generally, without restriction to the shown example, it may be advantageous to introduce adjacent damage zones in the form of groups, and interrupting the groups with gaps having a greater length than the distance of the damage zones 7 within the groups, so that upon etching the channels 70 combine to form openings 71 that are elongated along the path 55.

After etching, the glass disk 1 was toughened in a $KNO_3$ salt bath at a temperature of 390° C. for 10 and 20 minutes for example 1-6 and example 7, respectively.

After ion-exchanging, Example 1 of the glass disk 1 was cleaned and the workpieces 9 were separated by hand.

Example 2 of the glass disk 1 was etched again by a mixture of 1% $HNO_3$+1% $NH_4HF_2$ for 20 s, and then the scored workpieces 9 were separated by hand.

Example 3 of the glass article was cleaned and the scored glass dies were separated by hand, and then the so derived glass articles 10 were etched by a mixture of 1% $HNO_3$+1% $NH_4HF_2$ for 20 s.

Example 4 of the glass disk 1 was etched again by a mixture of 1% $HNO_3$+1% $NH_4HF_2$ for 20 s, and a liquid colorless polyimide was coated on the whole big sheets with a thickness of 50 μm, and then the workpieces were segregated.

Example 5 of the glass disk 1 was etched again by a mixture of 1% $HNO_3$+1% $NH_4HF_2$ for 20 s, a liquid colorless polyimide was bar coated on the whole big sheets with a thickness of 50 μm, then a 10 μm polymer hard coating material was spray coated, and finally the workpieces were segregated. The polyimide layer is perfect covered on the glass surface without any edge effect. All etching steps were done at 40° C. CS and DoL of the glass articles 10 were measured with FSM 6000. The CS and DoL are 700 MPa, and 7.2 μm, respectively.

Example 6 of the glass disk 1 was etched again by a mixture of 1% $HNO_3$+1% $NH_4HF_2$ for 20 s, a liquid colorless polyimide was bar coated on the whole big sheets with a thickness of 50 μm, then a 10 μm polymer hard coating material was coated on double side employing a dip coating method, and finally the workpieces were segregated. All etching steps were done at 40° C. CS and DoL of the glass articles 10 were measured with FSM 6000. The CS and DoL are 700 MPa, and 7.2 μm, respectively.

Example 7 of the glass disk 1 was bar coated with a liquid colorless polyimide on the whole big sheets with a thickness of 50 μm, then a 10 μm polymer hard coating material was spray coated on the first surface, and finally the workpieces were segregated. All etching steps were done at 40° C. CS and DoL of the glass articles 10 were measured with FSM 6000. The CS and DoL are 713 MPa, and 11.0 μm, respectively.

The impact resistance was tested with the pen drop test. In this test, the glass article is placed with its second surface on a 100 μm thick substrate, which consists of a 50 μm thick PE film and a 50 μm thick PSA film. The first surface side of the glass article is impacted until breakage by a 4.5 g pen with a ball-point made from tungsten carbide and having a diameter of 300 μm. For sample preparation, a weight of 2 kg was pressed onto the glass article to make a tight contact of the glass article with the PSA film. The first surface of the glass article is oriented upwards and impacted by the pen. The drop height of the pen is increased stepwise until the glass article breaks. The test is performed on the samples at room temperature of about 20° C. and relative humidity of about 50%. The breakage height (also called "pen drop height") is the maximum height from that the pen can drop onto the glass article when the glass article breaks into two or several pieces. 30 toughened samples were tested and evaluated. The average breakage height was calculated, and the B10 height was calculated using Weibull method.

Further, for determining a breakage bending radius 30 toughened samples of each thickness and DoL were tested by using 20 mm×70 mm sized samples in the 2-point bending method described above. The average breakage bending radius was calculated as described above.

TABLE 2 shows the test results for glass type 1 (0.05 mm), with different toughening conditions and results from a pen drop resistance and bending radius for the examples 1 to 7 (average values and calculated B10 values using Weibull method).

temperature of 380° C. for 1 h. After ion-exchange, Example 8 of the glass disk was cleaned and the scored glass dies were separated by hand to obtain samples of glass articles 10.

Example 9 of a glass disk was etched again by a mixture of 0.5% $NH_4HF_2$+1.5% $HNO_3$ for 50 s, and then the scored glass dies were separated by hand.

Example 10 of the glass article was cleaned and the scored glass dies were separated by hand, and then the so obtained glass articles were etched by a mixture of 0.5% $NH_4HF_2$+ 1.5% $HNO_3$ for 50 s. All the etching was done at a temperature of 40° C. CS and DoL of the glass dies were measured with SLP 100.

The impact resistance was tested with the pen drop test. In this test, the glass article is placed with its second side face 3 on a 100 μm substrate, which consists of 50 μm thick layers of PE and PSA. The first surface of the glass article

TABLE 2

| | Ex. 1 | Ex. 2 | Ex. 3 | Ex.4 | Ex.5 | Ex.6 | Ex.7 |
|---|---|---|---|---|---|---|---|
| Size (mm³) | | | 400*300*0.05 | | | | 400*300*0.07 |
| Laser pre-scoring | | | Yes | | | | |
| Pre-etching condition/ wt | | | 20 s in 1% $HNO_3$ +1% $NH_4HF_2$ | | | | |
| Toughening condition | | | 390° C. 10 min | | | | 390° C. 20 min |
| Breaking into small dies | Yes | No | Yes | No | No | No | No |
| Post-etching condition/ wt | No | 20 s in 1% $HNO_3$ + 1% $NH_4HF_2$ on big sheets | 20 s in 1% $HNO_3$ + 1% $NH_4HF_2$ on small de | 20 s in 1% $HNO_3$ + 1% $NH_4HF_2$ on big sheets | 20 s in 1% $HNO_3$ + 1% $NH_4HF_2$ on big sheets | 20 s in 1% $HNO_3$ + 1% $NH_4HF_2$ on big sheets | No |
| CPI/um | None | None | None | 50 | 50 | 50 | 50 |
| Hard coating/um | None | None | None | None | 10 um the first surface | 10 um on both the first and second surface | 10 um on the first surface |
| CS/MPa | 700 | 685 | 679 | 685 | 685 | 685 | 713 |
| DoL/μm | 7.2 | 6.5 | 6.5 | 6.5 | 6.5 | 6.5 | 11.0 |
| Average pen drop height/ mm | 12.4 | 17.8 | 17.3 | 51.3 | 63.6 | 65.3 | 75.2 |
| B10 for pen drop/mm | 8.2 | 21.5 | 18.1 | 35.8 | 38.3 | 39.1 | 45.6 |
| Average breakage bending radius/mm | <6 | <5 | <4 | <5 | <5 | <5 | <7 |

Embodiment 3—Glass Type 2

A glass disk of glass type 2 with a size of 400*300*0.07 mm was pre-scored into a series of separate rectangular workpieces with a size of 20 mm*70 mm with four rounded corners having a corner radius of 1 mm. A femtosecond laser with Bessel beam in a maximum power of 7 W was used to introduce the damage zones.

The as-pre-scored structured glass article was then etched using a mixture of 0.5% $NH_4HF_2$+1.5% $HNO_3$ for 50 s. Then the glass article was firstly toughened in 50% $KNO_3$+ 50% $NaNO_3$ salt bath at the temperature of 395° C. for 10 min, and then toughened in a 100% $KNO_3$ salt bath at a is impacted until breakage by a 4.5 g pen with a ball-point of 300 μm diameter, made from tungsten carbide. The glass articles were pressed onto the PSA film with a static weight of 2 kg to make a tight contact between the glass article with the PSA film. The first side face 2 of the glass article 10 is oriented upwards and impacted by the pen. Step by step the drop height of the pen is increased until the glass article breaks. The test was performed on the samples at room temperature of about 20° C. and relative humidity of about 50%. The breakage height (also called "pen drop height") is the maximum height from that the pen can drop onto the glass article when the glass article breaks into two or several pieces. 30 toughened samples were tested and evaluated.

The average breakage height was calculated, and the B10 height was calculated using Weibull method.

Further, for determining a breakage bending radius, 30 toughened samples of size 20 mm×70 mm were tested using the 2 point bending method as described above. The average breakage bending radius was calculated as described above.

TABLE 3 shows the test results concerning pen drop resistance and bending radius for the examples 8 to 10 (average values and calculated B10 values using Weibull method).

TABLE 3

| Glass type 2 (0.07 mm), toughening conditions and results | | | |
|---|---|---|---|
| | Example 8 | Example 9 | Example 10 |
| Size (mm³) | | 400*300*0.07 | |
| Laser pre-scoring | Yes | Yes | Yes |
| Pre-etching condition/wt | | 50 s in 0.5% NH₄HF₂ +1.5% HNO₃ | |
| Toughening condition Step 1 | 395° C. 10 min in 50 wt.% KNO₃ + 50 wt.% NaNO₃ | | |
| Step 2 | 380° C. 1 h in 50 wt.% KNO₃ + 50 wt.% NaNO₃ | | |
| Breaking into small dies | Yes | No | No |
| Post-etching condition/wt | No | 50 s in 0.5% NH₄HF₂ + 1.5% HNO₃ on big sheets | 50 s in 0.5% NH₄HF₂ + 1.5% HNO₃ on small de |
| CS /MPa | 610 | 597 | 597 |
| DoL of K/µm | 4.3 | 4.0 | 4.0 |
| DoL of Na/µm | 12 | 11.7 | 11.7 |
| Average pen drop height/mm | 11.4 | 20.5 | 21.2 |
| B10 for pen drop/mm | 8.3 | 12.1 | 11.8 |
| Average breakage bending radius /mm | <10 | <8 | <6 |

Embodiment 4—Glass Type 3

Glass disks 1 of glass type 3 with a diameter of 200 mm and a thickness of 0.175 mm were pre-scored to form workpieces of rectangular size of 10 mm*10 mm, having rounded corners with a corner radius of 1 mm. A femtosecond laser with Bessel beam and a maximum power of 6 W to introduce the damage zones. The as-pre-scored structured glass disks were etched by a mixture of 5% NH₄HF₂ for 5 min. Then the glass article was toughened in a KNO₃ salt bath at the temperature of 400° C. for 3 h after ion-exchange.

Example 11 of the glass disk was cleaned and the scored glass dies were separated via hand.

Example 12 of the glass article was etched again by a mixture of 5% NH₄HF₂ for 5 min, and then the scored glass dies were separated via hand.

Example 13 of the glass article was etched again by a mixture of 5% NH₄HF₂ for 5 min and coated with a 200 nm infrared coating, and finally the scored glass dies were separated by hand.

CS and DoL of the glass dies were measured with FSM 6000. The ball drop test of the prepared samples was tested by placing the glass on a steel plate and impacted by a 9 g steel ball. Step by step the drop height of the ball was increased until the glass article breaks. The 3-point bending strength was tested with a universal testing machine. The loading speed was 1 mm/min. The supporting span was 6 mm.

TABLE 4

| Glass type 3 (0.175 mm), toughening conditions and results | | | |
|---|---|---|---|
| | Example 11 | Example 12 | Example 13 |
| Size (mm³) | | Diameter 200*0.175 | |
| Laser pre-scoring | | Yes | |
| Pre-etching condition/wt | | 5 min in 5% NH₄HF₂ | |
| Toughening Temperature/ condition ° C. | 400 | 400 | 400 |
| Time/h | 3 | 3 | 3 |
| Breaking into small dies | Yes | No | No |
| Post-etching condition/wt | No | 5 min in 5% NH₄HF₂ | 5 min in 5% NH₄HF₂ |
| Coating | No | No | 200 nm infrared filter coating |
| CS/MPa | 307 | 272 | 272 |
| DoL/um | 14 | 12.3 | 12.3 |
| Average ball drop height/cm | 8.1 | 8.8 | 8.6 |
| 3PB/MPa | 531 | 567 | 558 |

Embodiment 5—Glass Type 4

Glass disks of glass type 4 with a size of 500*400*0.4 mm were pre-scored into a series of separate rectangular shaped workpieces with a size of 100 mm*60 mm, with rounded corners having a corner radius of 2 mm. The scoring was performed with a femtosecond laser with Bessel beam having a maximum power of 10 W. The as-pre-scored structured glass disks were then etched by a solution of 5% NH₄HF₂ for 2 min. Then the glass disks were toughened in a KNO₃ salt bath at a temperature of 400° C. for 3 h. After ion-exchange, the disk of Example 14 was cleaned and the scored glass dies were separated by hand. Example 15 was etched again by a solution of 5% NH₄HF₂ for 2 min, and then the scored glass dies were separated by hand. Example 16 was etched again by a mixture of 5% NH₄HF₂ for 2 min and coated with a 500 nm AR coating, and finally the scored glass dies were separated by hand. The edge effect of coating is avoided by inspection. CS and DoL of the glass articles were measured with FSM 6000. A ball drop test of the prepared samples was performed by placing the samples on a frame with the size of 100 mm*60 mm and impacted by a 30 g steel ball. The supporting distance of the frame is 2 mm for each edge. Step by step the drop height of the ball was increased until the glass article breaks. The 3-point bending strength was tested with a universal testing machine. The loading speed was 10 mm/min. The supporting span was 40 mm.

TABLE 5

| Glass type 4 (0.4 mm), toughening conditions and results | | | |
|---|---|---|---|
| | Example 14 | Example 15 | Example 16 |
| Size (mm³) | | 500*400*0.4 | |
| Laser pre-scoring | | Yes | |
| Pre-etching condition/wt | | 2 min in 5% NH₄HF₂ | |
| Toughening Temperature/ ° C. | 420 | 420 | 420 |
| condition Time/h | 2 | 2 | 2 |
| Breaking into small dies | Yes | No | No |
| Post-etching condition/wt | No | 2 min in 5% NH₄HF₂ | 2 min in 5% NH₄HF₂ |
| Coating | No | No | 500 nm AR coating |
| CS/MPa | 340 | 319 | 319 |
| DoL/um | 10.8 | 9.6 | 9.6 |
| Average ball drop | 34.1 | 41.9 | 43.9 |

TABLE 5-continued

| Glass type 4 (0.4 mm), toughening conditions and results | | | |
| --- | --- | --- | --- |
| | Example 14 | Example 15 | Example 16 |
| height/cm | | | |
| 3PB/MPa | 531 | 567 | 558 |

Embodiment 6—Glass Type 5

Glass disks of glass type 5 with size 200 mm*200 mm*0.2 mm were pre-scored into a series of separate rectangular size of 11 mm*11 mm with four rounded corner with corner diameter 2 mm using a femtosecond laser with a Bessel beam having a maximum power of 5 W. The as-pre-scored structured glass disks were then etched by a mixture of 5% $NH_4HF_2$ for 2 min. Then the glass article was toughened in $KNO_3$ salt bath at a temperature of 430° C. for 15 h. After ion-exchange, the glass disk of Example 17 was cleaned and the scored glass dies were separated by hand.

Example 18 was etched again by a mixture of 5% $NH_4HF_2$ for 2 min, and then the scored glass dies were separated by hand. CS and DoL of the so obtained glass articles were measured with FSM 6000. A ball drop test of the prepared samples was performed by placing the glass on a steel plate with a hole of 6 mm diameter and impacted by a 10 g steel ball. Step by step the drop height of the ball was increased until the glass article breaks. The 3-point bending strength was tested with a universal testing machine. The loading speed is 1 mm/min. The supporting span is 6 mm.

TABLE 6

| Glass type 5 (0.145 mm), toughening conditions and results | | |
| --- | --- | --- |
| | Example 17 | Example 18 |
| Size (mm$^3$) | 200*200*0.2 | |
| Laser pre-scoring | Yes | |
| Pre-etching condition/wt | 2 min in 5% $NH_4HF_2$ | |
| Toughening condition | Temperature/° C. | 430 | 430 |
| | Time/h | 15 | 15 |
| Breaking into small dies | Yes | No |
| Post-etching condition/wt | No | 2 min in 5% $NH_4HF_2$ |
| CS/MPa | 340 | 319 |
| DoL/um | 12.2 | 10.8 |
| Average ball drop height/cm | 6.5 | 7.1 |
| 3PB/MPa | 202 | 197 |

Figure 19:
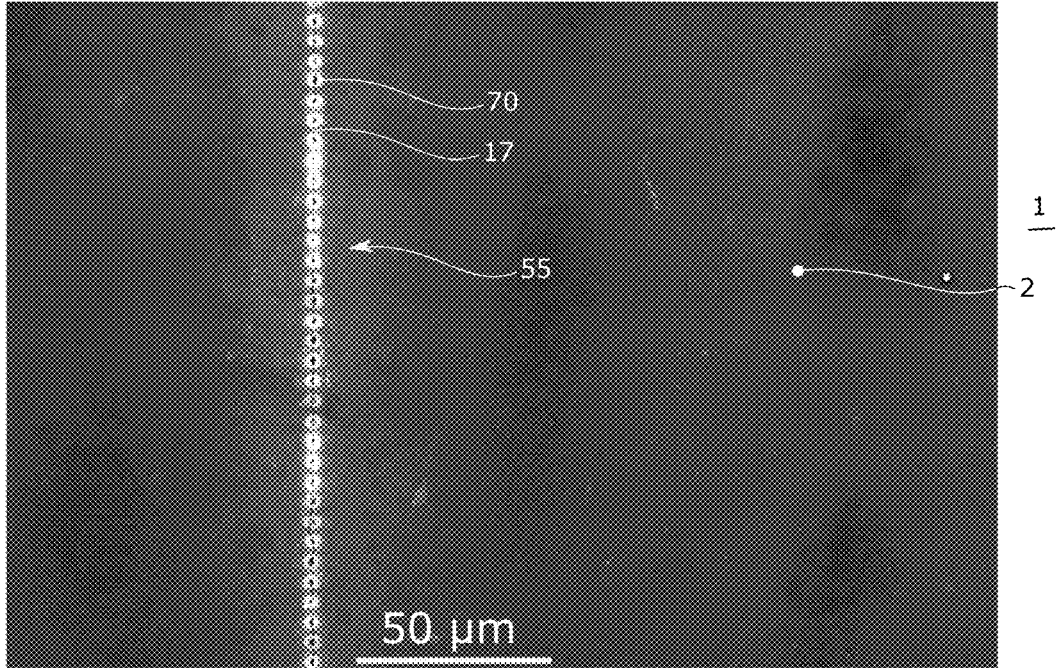
FIG. 19 is a SEM micrograph of the surface of a structured glass disc.

FIG. 19 shows a further view onto the surface of a structured glass disk 1 with channels 70 lined up along a path 55. In this example, the channels 70 remain isolated after etching. The channels also do not or at least not in each case form openings that connect both side faces of the glass disk 1.

LIST OF REFERENCE SIGNS 1 glass disk
2, 3 Side faces of glass disk 1
4 edge surface
5 ultrashort pulsed laser
7 damage zone
9 workpiece
10 glass article
11 part of 1 surrounding workpiece 9
12 coating
17 connecting sections 19 width of connecting section 17
50 laser beam
51 lens
52 focus of 50
55 ring-shaped path
70 channel
71 opening

What is claimed is:

1. A method for producing a structured glass disk, comprising:
   providing a glass disk having a thickness of less than 50 μm between opposite side faces;
   directing a laser beam of an ultrashort pulsed laser onto the glass disk, the laser beam having a wavelength at which glass of the glass disk is transparent so that the laser beam can penetrate into the glass disk;
   focusing the laser beam to produce an elongated focus within the glass disk, the laser beam having an intensity sufficient to produce a channel within the glass disk along the elongated focus;
   moving the laser beam and the glass disk relative to one another along a ring-shaped path so that the laser beam introduces a plurality of channels adjacent to one another to define a workpiece in the glass disk with the ring-shaped path encompassing the workpiece and with the workpiece remaining connected to surrounding sections of the glass disk;
   exposing the glass disk to an etchant so that the etchant intrudes into the plurality of channels such that the workpiece is connected to the surrounding sections of the glass disk by connecting sections;
   chemically toughening, after exposing to the etchant, the glass disk and the at least one workpiece to define a depth of an ion exchange layer, wherein the connecting sections have a width that is at most twice the depth of the ion exchanged layer; and
   separating the at least one workpiece from the glass disk at the connecting sections after the step of chemically toughening.

2. The method of claim 1, wherein the step of exposing the glass disk to the etchant comprises widening the plurality of channels such that at least some of the plurality of channels combine to form combined channels.

3. The method of claim 1, wherein the step of moving the laser beam and the glass disk relative to one another further comprises moving such that the plurality of channels are introduced in groups with gaps between adjacent groups, wherein the gaps between adjacent groups have a greater length than a distance of between the plurality of channels within the groups.

4. The method of claim 3, wherein the step of exposing the glass disk to the etchant comprises widening the plurality of channels within the groups to form openings along the ring-shaped path with the gaps between the adjacent groups remaining.

5. The method of claim 1, wherein the step of chemically toughening comprises:
   immersing the glass disk into an ion exchange bath such that alkali ions penetrate into the plurality of channels and effect an ion exchange in glass surrounding the plurality channels in inner sections of the glass disk, the inner regions being deeper within the glass disk than the depth of the ion exchange layer on the opposite side faces of the glass disk.

6. The method of claim 1, further comprising applying a coating onto at least one of the opposite side faces.

7. The method of claim 6, wherein the step of applying the coating is after the chemically toughening step.

8. The method of claim 1, wherein the plurality of channels extend from one of the opposite side faces and end within the thickness of the glass disk so that a plurality of blind holes are defined within the glass disk.

9. The method of claim 1, further comprising laminating a polymer layer to the workpiece.

10. The method of claim 1, wherein the etchant is selected from a group consisting of: an acidic aqueous solution comprising one or more of HF, $H_2SO_4$, HCl, and $NH_4HF_2$; an acidic solution comprising a concentration of hydrogen ions less than 25 mol/L; an acidic solution comprising a concentration of hydrogen ions less than 0.1 mol/L; an alkaline aqueous solution comprising one or more of LiOH, NaOH, and KOH; an alkaline solution having a concentration of OH-ions less than 25 mol/L; and an alkaline solution having a concentration of OH-ions less than 10 mol/L.

11. The method of claim 1, wherein the step of exposing the glass disk to the etchant reduces the thickness of the glass disk by 0.2 μm to 10 μm.

12. The method of claim 1, wherein the thickness is at least 5 μm.

13. The method of claim 1, wherein the step of providing the glass disk comprises providing glass that comprises a composition selected from a group consisting of:
$Al_2O_3$, $Na_2O$, and $K_2O$, wherein the $K_2O$ has a content that is less than a content of the $Na_2O$;
$SiO_2$, $B_2O_3$, and $P_2O_5$, where a sum of the $SiO_2$, $B_2O_3$, and $P_2O_5$ has a content of at least 40 wt.-%;
an $SiO_2$ content that is less than 90 wt.-%;
an $SiO_2$ content that is between 40 and 75 wt.-%;
a $B_2O_3$ is content between 5 and 20 wt. %;
a $B_2O_3$ is content between 5 and 18 wt.-%;
an $Al_2O_3$ content of at least 2 wt.-%;
an $Al_2O_3$ content of at least 10 wt.-%;
an $Al_2O_3$ content of at most 30 wt.-%;
an $Al_2O_3$ content of at most 27 wt.-%;
an $Li_2O$ content of at most 5 wt.-%;
an $Na_2O$ content of at least 4 wt.-% and at most 30 wt.-%;
an $Na_2O$ content of at least 8 wt.-% and at most 30 wt.-%;
a $K_2O$ content of at most 10 wt. %;
an overall content of alkaline oxides in a range of from 2 wt.-% to 35 wt.-%;
an overall content of alkaline oxides in a range of from 3 wt.-% to 30 wt.-%; and
an overall content of alkaline earth that is not higher than 40 wt.-%.

14. The method of claim 1, wherein the chemically toughening step results in the glass disk and the at least one workpiece having a compressive stress region that extends at least partly along the plurality of channels with the compressive stress region having compressive stresses with a direction component along the plurality of channels.

15. The method of claim 1, wherein the plurality of channels have a diameter in a range of 0.1 to 10 μm.

16. The method of claim 1, wherein at least the workpiece has a feature selected from a group consisting of: a breakage height, given in mm, of at least 200 times of the thickness, the breakage height being measured using a pen drop test with a 4.5 g pen with a ball-point having a diameter of 300 μm and made from tungsten carbide; a breakage bending radius, given in mm, that is smaller than 100000*t/CS, wherein t is the thickness in mm and wherein CS is the compressive stress, given in MPa; a compressive stress in a range from equal to or more than 100 MPa to at most 1200 MPa; and any combination thereof.

17. The method of claim 1, wherein the step of providing the glass disk comprises providing glass that comprises a composition having (in wt.-%):
$SiO_2$ 50-70;
$Al_2O_3$ 10-27;
$B_2O_3$ 0-18;
$Li_2O+Na_2O+K_2O$ 5-28;
$MgO+CaO+SrO+BaO+ZnO$ 0-13;
$TiO_2+ZrO_2$ 0-13; and
$P_2O_5$ 0-9.

18. A method for producing a structured glass disk, comprising:
providing a glass disk having a thickness of less than 50 μm between opposite side faces;
directing a laser beam of an ultrashort pulsed laser onto the glass disk, the laser beam having a wavelength at which glass of the glass disk is transparent so that the laser beam can penetrate into the glass disk;
focusing the laser beam to produce an elongated focus within the glass disk, the laser beam having an intensity sufficient to produce a channel within the glass disk along the elongated focus;
moving the laser beam and the glass disk relative to one another along a ring-shaped path so that the laser beam introduces a plurality of channels adjacent to one another to define a workpiece in the glass disk with the ring-shaped path encompassing the workpiece and with the workpiece remaining connected to surrounding sections of the glass disk;
exposing the glass disk to an etchant so that the etchant intrudes into the plurality of channels; and
chemically toughening, after exposing to the etchant, the glass disk and the at least one workpiece,
wherein the step of chemically toughening comprises immersing the glass disk into an ion exchange bath such that alkali ions penetrate into the plurality of channels and effect an ion exchange in glass surrounding the plurality channels in inner sections of the glass disk, the inner regions being deeper within the glass disk than a depth of an ion exchange layer on the opposite side faces of the glass disk, and
wherein the workpiece, after the step of exposing the glass disk to the etchant, remains connected to the surrounding sections of the glass disk by connecting sections, wherein the connecting sections have a width that is at most twice the depth of the ion exchanged layer.

19. The method of claim 18, wherein the step of providing the glass disk comprises providing glass that comprises a composition having (in wt.-%):
$SiO_2$ 50-70;
$Al_2O_3$ 10-27;
$B_2O_3$ 0-18;
$Li_2O+Na_2O+K_2O$ 5-28;
$MgO+CaO+SrO+BaO+ZnO$ 0-13;
$TiO_2+ZrO_2$ 0-13; and
$P_2O_5$ 0-9.

20. A method for producing a structured glass disk, comprising:
providing a glass disk having a thickness of less than 50 μm between opposite side faces;
directing a laser beam of an ultrashort pulsed laser onto the glass disk, the laser beam having a wavelength at which glass of the glass disk is transparent so that the laser beam can penetrate into the glass disk;

focusing the laser beam to produce an elongated focus within the glass disk, the laser beam having an intensity sufficient to produce a channel within the glass disk along the elongated focus;

moving the laser beam and the glass disk relative to one another along a ring-shaped path so that the laser beam introduces a plurality of channels adjacent to one another to define a workpiece in the glass disk with the ring-shaped path encompassing the workpiece and with the workpiece remaining connected to surrounding sections of the glass disk by connecting sections;

exposing the glass disk to an etchant so that the etchant intrudes into the plurality of channels and reduces the thickness of the glass disk by 0.2 μm to 10 μm the workpiece remaining connected to surrounding sections of the glass disk by connecting sections having a width;

chemically toughening, after exposing to the etchant, the glass disk and the at least one workpiece to provide a depth of an ion exchanged layer, the width being at most twice the depth; and separating the at least one workpiece from the glass disk at the surrounding sections after the step of chemically toughening.

* * * * *